United States Patent
Masutani et al.

(10) Patent No.: US 8,728,314 B2
(45) Date of Patent: May 20, 2014

(54) MEMBRANE MODULE AND MEMBRANE CASSETTE

(75) Inventors: Hidetoshi Masutani, Amagasaki (JP); Yasunobu Okajima, Amagasaki (JP); Tomokazu Kitano, Amagasaki (JP)

(73) Assignee: Kubota Corporation, Osaka (JP)

( * ) Notice: Subject to any disclaimer, the term of this patent is extended or adjusted under 35 U.S.C. 154(b) by 332 days.

(21) Appl. No.: 12/934,298

(22) PCT Filed: Mar. 27, 2008

(86) PCT No.: PCT/JP2008/000753
§ 371 (c)(1),
(2), (4) Date: Sep. 24, 2010

(87) PCT Pub. No.: WO2009/118785
PCT Pub. Date: Oct. 1, 2009

(65) Prior Publication Data
US 2011/0049037 A1    Mar. 3, 2011

(51) Int. Cl.
*B01D 63/00* (2006.01)

(52) U.S. Cl.
USPC ............ 210/321.6; 210/321.72; 210/232; 210/238; 210/252; 210/253; 210/257.2; 210/321.75; 210/321.79; 210/321.84; 210/321.88; 210/323.1; 210/335; 210/428; 210/450; 210/489

(58) Field of Classification Search
USPC ......... 285/201, 204, 205, 208, 325, 189, 376, 285/402, 401
See application file for complete search history.

(56) References Cited

U.S. PATENT DOCUMENTS

| | | | | |
|---|---|---|---|---|
| 2,133,852 A | * | 10/1938 | Dillhoefer | 285/204 |
| 4,033,613 A | * | 7/1977 | Bram | 285/184 |
| 4,758,023 A | * | 7/1988 | Vermillion | 285/7 |
| 5,525,220 A | | 6/1996 | Yagi et al. | 210/321.79 |
| 5,904,381 A | * | 5/1999 | Ohmi et al. | 285/328 |
| 6,312,019 B1 | * | 11/2001 | Nakazumi et al. | 285/39 |
| 6,630,069 B2 | | 10/2003 | Sadashita et al. | 210/321.69 |
| 7,040,670 B2 | * | 5/2006 | Madden | 285/376 |

(Continued)

FOREIGN PATENT DOCUMENTS

| | | | | |
|---|---|---|---|---|
| AU | 744404 | | 1/1999 | B01D 63/02 |
| DE | 102005052486 | | 5/2007 | B01D 29/88 |

(Continued)

OTHER PUBLICATIONS

JP10-192661; Jul. 1998; Japan; Sakashita et al; B01 D 63/02 (English Machine Translation).*

(Continued)

*Primary Examiner* — Lore Jarrett
*Assistant Examiner* — Benjamin J Behrendt
(74) *Attorney, Agent, or Firm* — Kusner & Jaffe

(57) ABSTRACT

A membrane element is provided between a pair of water collecting cases. Water collecting spaces in which permeate having penetrated through the membrane element is collected are formed in the water collecting cases. The water collecting case of one membrane module and the water collecting case of the other membrane module are coupled via coupling portions. The coupling portions have flow holes. The water collecting space of the water collecting case of the one membrane module and the water collecting space of the water collecting case of the other membrane module communicate with each other via the flow holes of the coupling portions.

3 Claims, 35 Drawing Sheets

(56) References Cited

U.S. PATENT DOCUMENTS

| | | | |
|---|---|---|---|
| 7,217,364 B2 | 5/2007 | Lauer et al. | 210/321.79 |
| 2001/0009235 A1 | 7/2001 | Sakashita et al. | 210/321.8 |
| 2002/0153297 A1* | 10/2002 | Bozenmayer | 210/232 |
| 2006/0091074 A1* | 5/2006 | Pedersen et al. | 210/636 |

FOREIGN PATENT DOCUMENTS

| | | | | |
|---|---|---|---|---|
| EP | 0 887 100 | 12/1998 | ............ | B01D 63/02 |
| JP | 48-37525 | 11/1973 | | |
| JP | 49-146521 | 12/1974 | | |
| JP | 51-105230 | 8/1976 | ................ | E02B 9/02 |
| JP | 52-16031 | 2/1977 | ............ | F16L 27/12 |
| JP | 52-29620 | 3/1977 | ............ | F16L 27/00 |
| JP | 57-55803 | 4/1982 | ............ | F22B 37/44 |
| JP | 64-067207 | 3/1989 | ............ | B01D 13/01 |
| JP | 02-086818 | 3/1990 | ............ | B01D 63/06 |
| JP | 02-251221 | 10/1990 | ............ | B01D 53/22 |
| JP | 05-63632 | 8/1993 | ............ | B01D 63/04 |
| JP | 05-220357 | 8/1993 | ............ | B01D 63/02 |
| JP | 7-171357 | 7/1995 | ............ | B01D 63/04 |
| JP | 08-071570 | 3/1996 | ................ | C02F 1/68 |
| JP | 09-047762 | 2/1997 | ................ | C02F 1/44 |
| JP | 09-119561 | 5/1997 | ................ | F16L 5/00 |
| JP | 10-180050 | 7/1998 | ............ | B01D 63/08 |
| JP | 10-192661 | 7/1998 | ............ | B01D 63/02 |
| JP | 11-006589 | 1/1999 | ............ | F16L 27/00 |
| JP | 2000-246065 | 9/2000 | ............ | B01D 63/04 |
| JP | 2005-503902 | 2/2005 | ............ | A61M 1/18 |
| JP | 2005-205369 | 8/2005 | ............ | B01D 63/00 |
| JP | 2007-083129 | 4/2007 | ............ | B01D 63/04 |

OTHER PUBLICATIONS

Sakashita et al, "Submerged Hollow Fiber Membrane Separation Module and Manufacturing Method of the Same", Jul. 28, 1998, JP 10-192661, (Human Translation).*

Okazaki et al, "Membrane Module Unit and Connection Member Used for This Unit", Aug. 4, 2005, JP 2005-205369, (Human Translation).*

Human Translation of JP 52-029620 U by Sunohara, Hideo et al. published Aug. 22, 1975.*

Supplementary European Search Report for EP 08 72 0632, Jun. 13, 2012.

International Search Report for International Application No. PCT/JP2008/000753, Jul. 8, 2008.

Office Action (dated Aug. 21, 2013) issued in connection with corresponding Japanese Patent Application No. 2010-505029.

* cited by examiner

FIG. 12
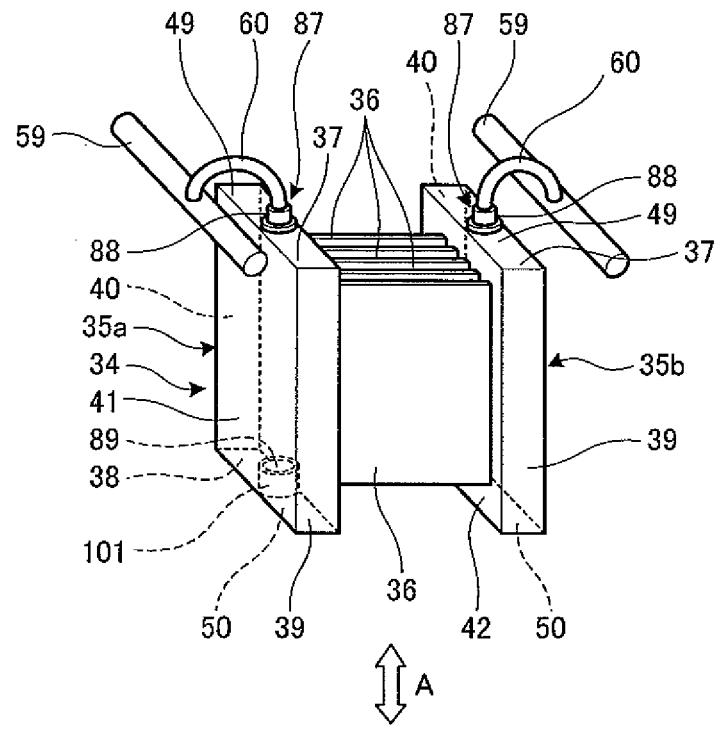
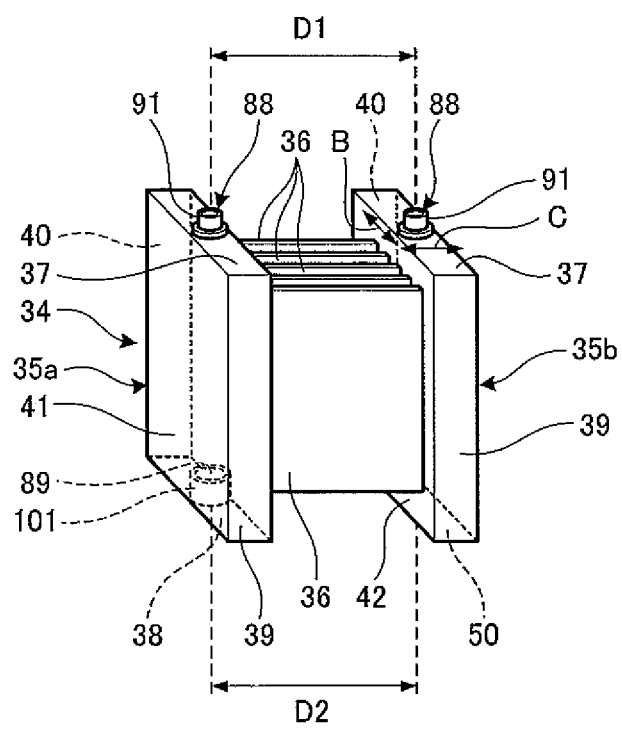

MEMBRANE MODULE AND MEMBRANE CASSETTE

TECHNICAL FIELD

The present invention relates to a membrane module used for solid-liquid separation in, for example, sewage and wastewater treatment and sludge concentration, and a membrane cassette including a plurality of the membrane modules.

BACKGROUND ART

Conventionally, as shown in FIGS. 40 to 42, the membrane module of this type includes, for example, a plurality of filtration membranes 11 having an elongated tubular shape, holding members 12 and 13 for holding both ends of the filtration membranes 11, and a reinforcing frame 14 having the holding members 12 and 13 attached thereto for reinforcement. Inside the holding member 12, a water collecting space 16 is formed in which permeate having permeated through the filtration membranes 11 is collected. In the holding member 12 on one side, a water collecting nozzle 18 communicating with the water collecting space 16 is provided. The water collecting nozzle 18 projects to the outer side of the holding member 12.

In the reinforcing frame 14, coupling portions 17 for coupling membrane modules 15 adjacent to each other in the up-down direction are provided. The coupling portions 17 include projections 17*a* provided in the upper part of the reinforcing frame 14 and recesses 17*b* provided in the lower part of the reinforcing frame 14.

A membrane cassette 19 is formed by stacking the plurality of membrane modules 15 in the up-down direction. The membrane cassette 19 is immersed in a treatment tank 20. The water collecting nozzle 18 of each of the membrane modules 15 is connected to a suction pipe 21 for sucking permeate (filtrate). A suction pump 22 is connected to the downstream side of the suction pipe 21.

Therefore, when the plurality of membrane modules 15 are stacked in an up-down direction A, the upper membrane module 15 is coupled to the lower membrane module 15 by fitting the projection 17*a* of the lower membrane module 15 in the recess 17*b* of the upper membrane module 15. It is possible to prevent the upper membrane module 15 from disengaging from the lower membrane module 15 in a front-rear direction B or a left-right direction C.

Permeate having permeated from the outer sides to the inner sides of the filtration membranes 11 is collected in the water collecting space 16, flows from the water collecting space 16 to the suction pipe 21 through the water collecting nozzle 18, and is extracted to the outside of the treatment tank 20.

The membrane module 15 is described in Japanese Patent Application Laid-Open No. H02-86818.

DISCLOSURE OF THE INVENTION

Problems to be Solved by the Invention

In the conventional system, since the water collecting nozzle 18 is provided in the membrane module 15 separately from the coupling portions 17, the number of components disadvantageously increases. Since the water collecting nozzle 18 projects to the outer side of the membrane module 15, the membrane module 15 increases in size and a space necessary for setting the membrane module 15 increases.

It is an object of the present invention to prevent a plurality of membrane modules arrayed adjacent to each other from disengaging from each other, reduce the number of components of the membrane modules, and reduce the sizes of the membrane modules.

Means for Solving the Problems

In order to attain the object, a membrane module of a first invention which is immersed in a liquid to be treated and performs filtration, the membrane module includes:
a pair of water collecting cases; and at least one membrane element provided between the pair of water collecting cases, wherein
water collecting spaces in which permeate having permeated through the membrane element is collected are formed in the water collecting cases,
the water collecting cases can be coupled via coupling portions to the water collecting cases of another membrane module adjacent to the membrane module in a predetermined arrangement direction,
the coupling portions have flow holes, and
the water collecting spaces communicate with the water collecting spaces of the water collecting cases of the other membrane module via the flow holes of the coupling portions.

Consequently, when the plurality of membrane modules are arrayed in the predetermined arrangement direction, the membrane modules adjacent to each other are coupled via the coupling portions. It is possible to prevent the membrane modules from disengaging from each other in a direction orthogonal to the predetermined arrangement direction.

The liquid to be treated in a treatment tank is collected as permeate in the water collecting spaces of the water collecting cases after having permeated through the membrane elements of the membrane modules to be filtered. The permeate collected in the water collecting spaces in this way can flow into the water collecting spaces in the water collecting cases of the other coupled membrane module through the flow holes of the coupling portions. Consequently, the water collecting spaces of the plurality of membrane modules coupled to each other communicate with each other via the flow holes of the coupling portions. The permeate can be extracted to the outside of the treatment tank from the water collecting spaces of any one specific membrane module (e.g., a membrane module located at the outermost end).

As described above, the coupling portions have the function of coupling the membrane modules adjacent to each other and the function of causing the water collecting spaces of the membrane modules adjacent to each other to communicate with each other. Therefore, a pipe used exclusively for coupling the water collecting spaces of the membrane modules adjacent to each other is unnecessary. The number of components of the membrane module is reduced and the membrane module is reduced in size.

In a membrane module of a second invention, the coupling portions have fitting holes or fitting recesses, and fitting projections that can be detachably fit into the fitting holes or fitting recesses in the predetermined arrangement direction.

Consequently, when the plurality of membrane modules are arrayed in the predetermined arrangement direction, the fitting projections of one of the membrane modules adjacent to each other are fit into the fitting holes or fitting recesses of the other membrane module (different membrane module). Thus, the membrane modules adjacent to each other are coupled via the coupling portions. It is possible to prevent the membrane modules from disengaging from each other in a direction orthogonal to the predetermined arrangement direction.

In a membrane module of a third invention, at least one of the fitting projections and the fitting holes are displaceable within a predetermined range in a direction orthogonal to the predetermined arrangement direction while keeping water tightness with the water collecting spaces with which the membrane modules communicate.

Consequently, for example, when the fitting projections of one of the membrane modules adjacent to each other are fit into the fitting holes of the other membrane module (different membrane module) to couple the one membrane module and the other membrane module in the predetermined arrangement direction, if the positions of the fitting projections of the one membrane module and the positions of the fitting holes of the other membrane module deviate from each other because of a dimension error during the manufacture of the membrane modules or a dimension change caused by heat or contained water, the fitting projections or the fitting holes are displaced within the predetermined range in the direction orthogonal to the predetermined arrangement direction while keeping water tightness. Thus, the deviation of the positions of the fitting projections and the positions of the fitting holes is absorbed. It is possible to surely fit the fitting projections of the one membrane module into the fitting holes of the other membrane module.

In a membrane module of a fourth invention, the coupling portions include tubular members having the fitting holes and holding mechanisms for holding at least one of the fitting projections and the tubular members to be displaceable within the predetermined range in the orthogonal direction.

In a membrane module of a fifth invention, the holding mechanisms include annular circumferential wall portions provided in the water collecting cases, annular inner brim portions projecting from the ends of the circumferential wall portions to an inner side in a radial direction, and holding spaces formed between the water collecting cases and the inner brim portions, the fitting projections include outer brim portions projecting to an outer side in the radial direction and are inserted into the inner sides of the circumferential wall portions, and the outer brim portions of the fitting projections are inserted into the holding spaces.

Consequently, the outer brim portions slide in the radial direction in the holding spaces, whereby the fitting projections are displaced within the predetermined range in the direction orthogonal to the predetermined arrangement direction while keeping water tightness. Thus, the deviation of the positions of the fitting projections and the positions of the fitting holes is absorbed.

In a membrane module of a sixth invention, the holding mechanisms include tubular circumferential wall portions provided in the water collecting cases, holding grooves formed in the circumferential wall portions, and holding pawls provided in the fitting projections, the fitting projections are inserted into the inner sides of the circumferential wall portions, and the holding pawls project to the outer side in the radial direction of the fitting projections and are inserted into the holding grooves.

Consequently, the holding pawls slide in the radial direction in the holding grooves, whereby the fitting projections are displaced within the predetermined range in the direction orthogonal to the predetermined arrangement direction while keeping water tightness. Thus, the deviation of the positions of the fitting projections and the positions of the fitting holes is absorbed.

A membrane module of a seventh invention includes at least one of projection inclined surfaces which are formed in the distal end portions of the fitting projections and narrowed in the radial direction toward the distal ends and hole inclined surfaces which are formed in the outer end portions of the fitting holes and expanded in the radial direction toward the outer ends.

Consequently, when the fitting projections of one of the membrane modules adjacent to each other are fit into the fitting holes of the other membrane module (different membrane module), the fitting projections are guided to the fitting holes by at least one of the projection inclined surfaces and the hole inclined surfaces. Therefore, the fitting projections are smoothly and surely fit into the fitting holes.

An eighth invention of a membrane cassette in which the plurality of membrane modules described in any one of the first to seventh inventions are arrayed in the predetermined arrangement direction. The water collecting cases of the membrane modules adjacent to each other are detachably coupled via the coupling portions, and the water collecting spaces of the membrane modules adjacent to each other are coupled via the flow holes.

Advantages of the Invention

As explained above, according to the present invention, the membrane modules adjacent to each other are coupled via the coupling portions. It is possible to prevent the membrane modules from disengaging from each other in the direction orthogonal to the predetermined arrangement direction.

The water collecting spaces of the plurality of membrane modules coupled to each other communicate with each other via the flow holes of the coupling portions. Therefore, the permeate can be extracted to the outside of the treatment tank from the water collecting space of any one specific membrane module (e.g., the membrane module located at the outermost end).

In this way, the flow holes are formed in the coupling portions and the water collecting spaces of the plurality of membrane modules communicate with each other via the flow holes of the coupling portions. Therefore, the number of components of the membrane module is reduced and the membrane module is reduced in size.

When the positions of the fitting projections of the one membrane module and the positions of the fitting holes of the other membrane module deviate from each other, the fitting projections or the fitting holes are displaced within the predetermined range in the direction orthogonal to the predetermined arrangement direction, whereby the deviation of the positions of the fitting projections and the positions of the fitting holes is absorbed. It is possible to surely fit the fitting projections of the one membrane module into the fitting holes of the other membrane module.

The fitting projections are guided to the fitting holes by at least one of the projection inclined surfaces and the hole inclined surfaces. Therefore, the fitting projections are smoothly and surely fit into the fitting holes.

BRIEF DESCRIPTION OF THE DRAWINGS

FIG. 12 is a perspective view of a membrane module according to a third embodiment of the present invention;

BEST MODE FOR CARRYING OUT THE INVENTION

A first embodiment of the present invention is explained below on the basis of the drawings.

Figure 1:
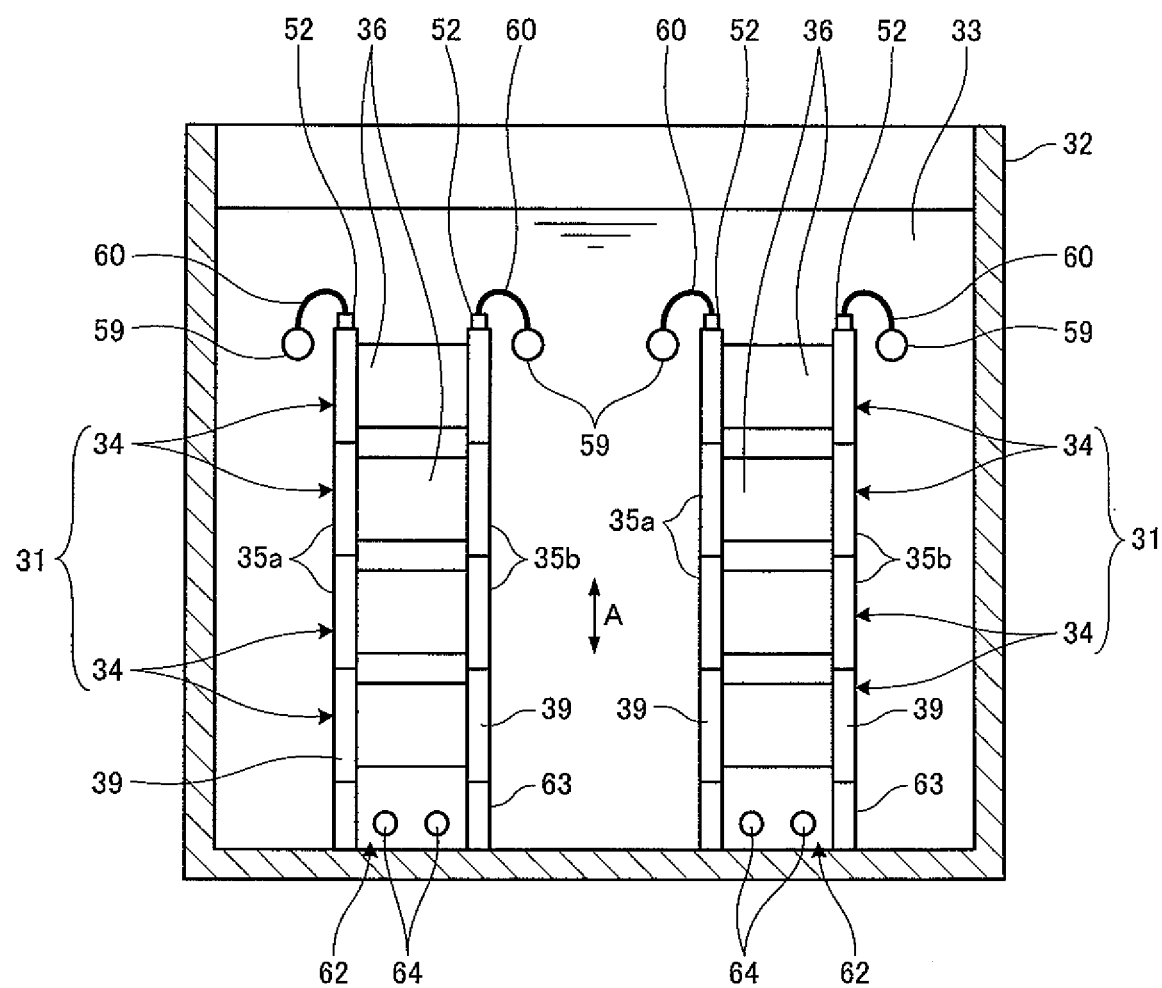
FIG. 1 is a front view of a membrane cassette according to a first embodiment of the present invention.
Figure 2:
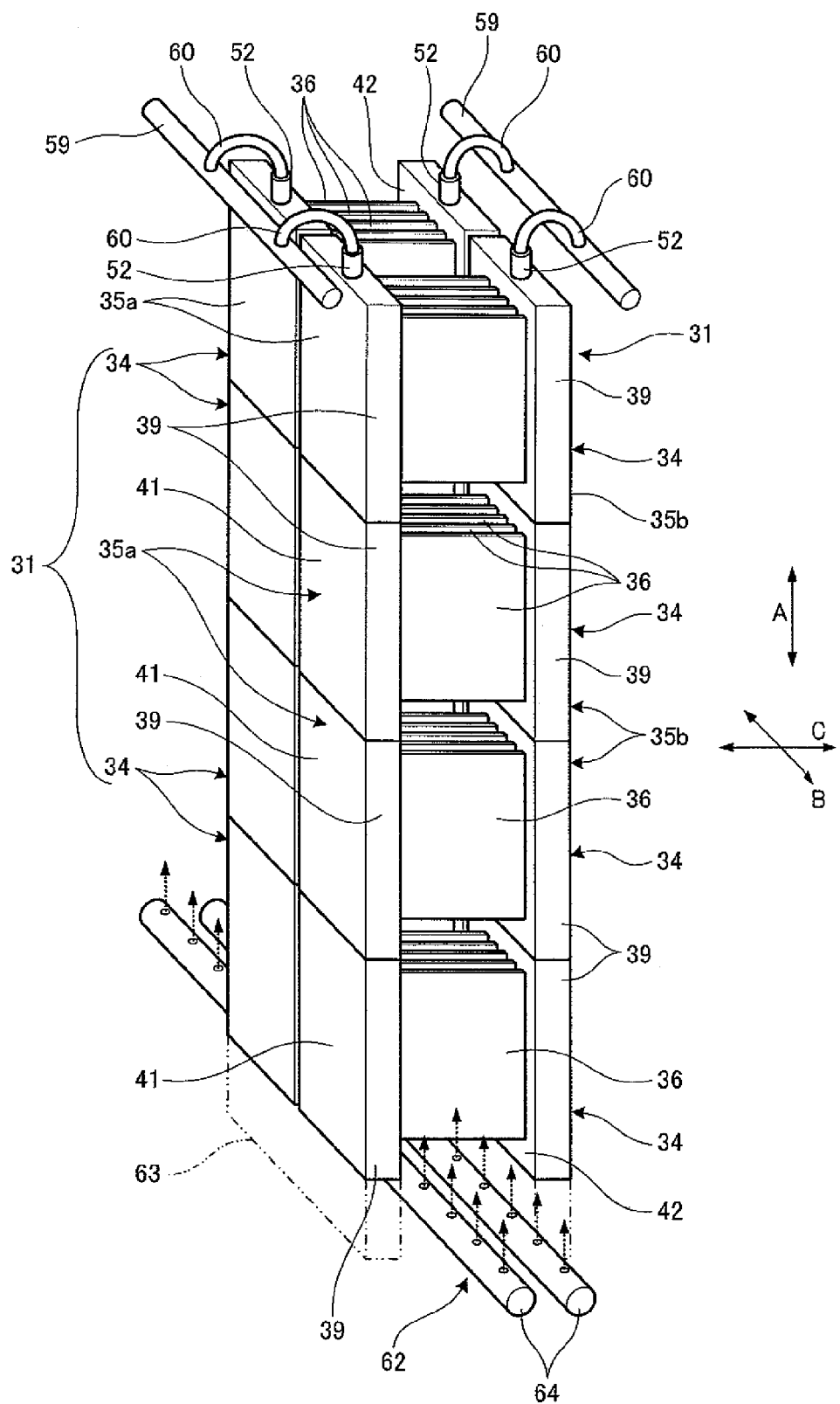
FIG. 2 is a perspective view of the membrane cassette according to the first embodiment.

As shown in FIGS. 1 and 2, reference numeral 31 denotes a membrane cassette. The membrane cassettes 31 are set in a treatment tank 32 and immersed in a liquid to be treated 33. The membrane cassettes 31 each include a plurality of membrane modules 34 stacked in an up-down direction A (an example of a predetermined arrangement direction).

Figure 3:
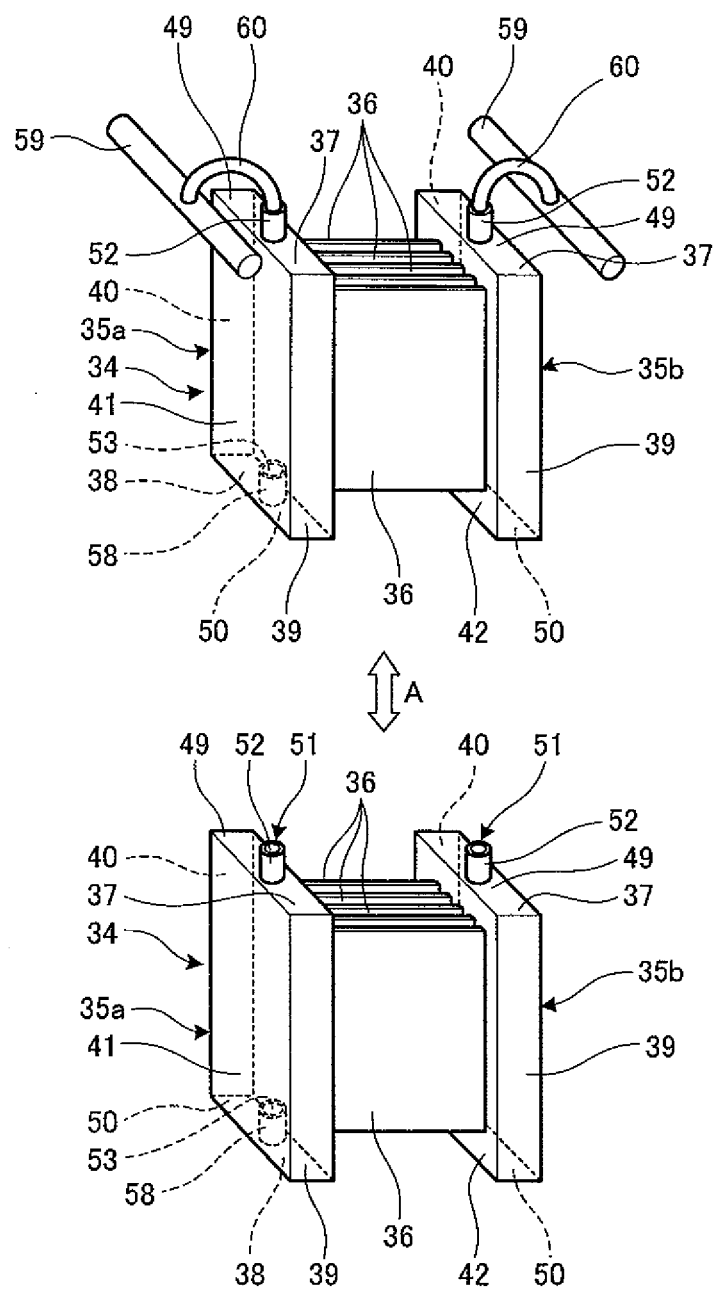
FIG. 3 is a perspective view of a membrane module forming the membrane cassette according to the first embodiment.
Figure 4:
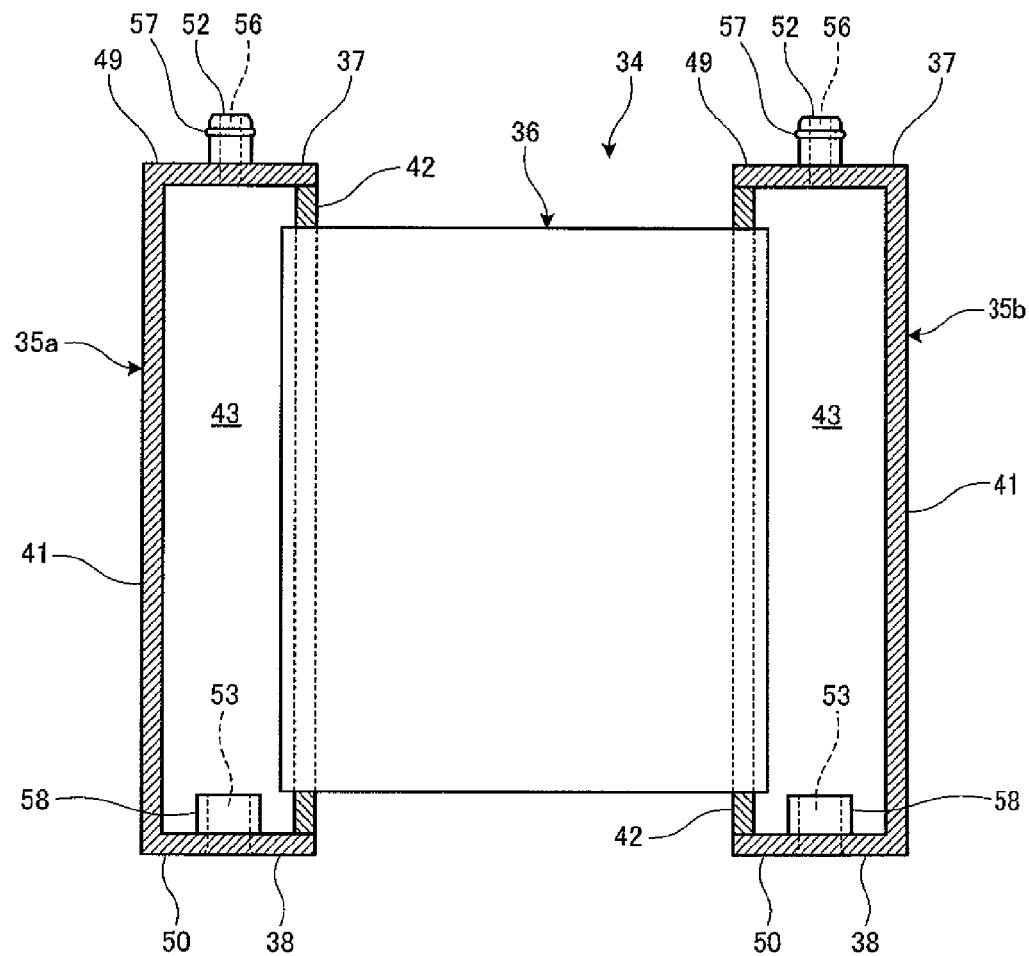
FIG. 4 is a longitudinal sectional view of the membrane module according to the first embodiment.

As shown in FIGS. 3 and 4, each of the membrane modules 34 includes a pair of left and right water collecting cases 35a and 35b and a plurality of membrane elements 36 disposed between the water collecting cases 35a and 35b. Each of the water collecting cases 35a and 35b is a square box-like member including an upper plate 37 and a lower plate 38, a front plate 39 and a rear plate 40, and an outer plate 41 and an inner plate 42, and includes a water collecting space 43 inside. Although the water collecting cases 35a and 35b are formed in a square box shape, the water collecting cases 35a and 35b are not limited to this shape. For example, the water collecting cases 35a and 35b may have, for example, a semi-columnar shape, a triangular prism shape, or a polygonal prism shape.

Figure 5:
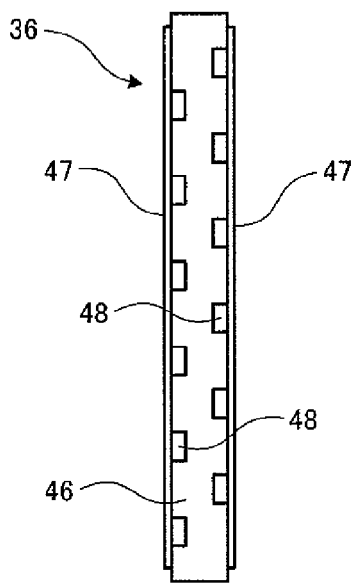
FIG. 5 is a side view of a membrane element of the membrane module according to the first embodiment.

The membrane elements 36 are arrayed in parallel at predetermined intervals. As shown in FIG. 5, each of the membrane elements 36 includes a filtration plate 46 having a flat square shape that is a membrane supporting member and filtration membranes 47 formed of flat membranes attached to the front and rear surfaces of the filtration plate 46. Permeate flow channels 48 in the horizontal direction communicating with the water collecting space 43 are respectively formed on the front and rear surfaces of the filtration plate 46.

As the membrane supporting member, in addition to a rigid filtration plate made of resin or the like, a filtration plate of a flexible material such as non-woven fabric or a net may be used.

The inner plates 42 of the water collecting cases 35a and 35b are formed of resin which also serves as an adhesive. As shown in FIG. 4, the left and right side edges of each of the membrane elements 36 pierce through the inner plates 42 to reach the water collecting spaces 43. Consequently, the membrane elements 36 are water-tightly bonded to the water collecting cases 35a and 35b and are supported between the water collecting cases 35a and 35b.

The water collecting cases 35a and 35b have upper coupling surfaces 49 in the upper end portions and have lower coupling surfaces 50 in the lower end portions.

Figure 6:
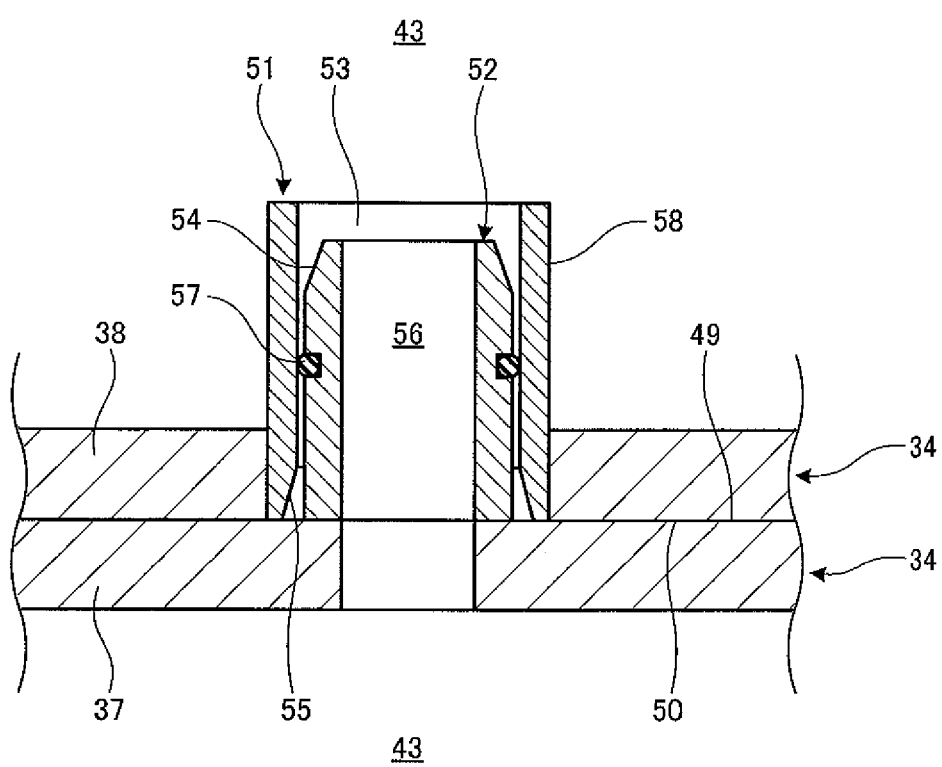
FIG. 6 is a longitudinal sectional view of a coupling portion of the membrane module according to the first embodiment and shows a state in which a fitting projection is fit into a fitting hole.
Figure 7:
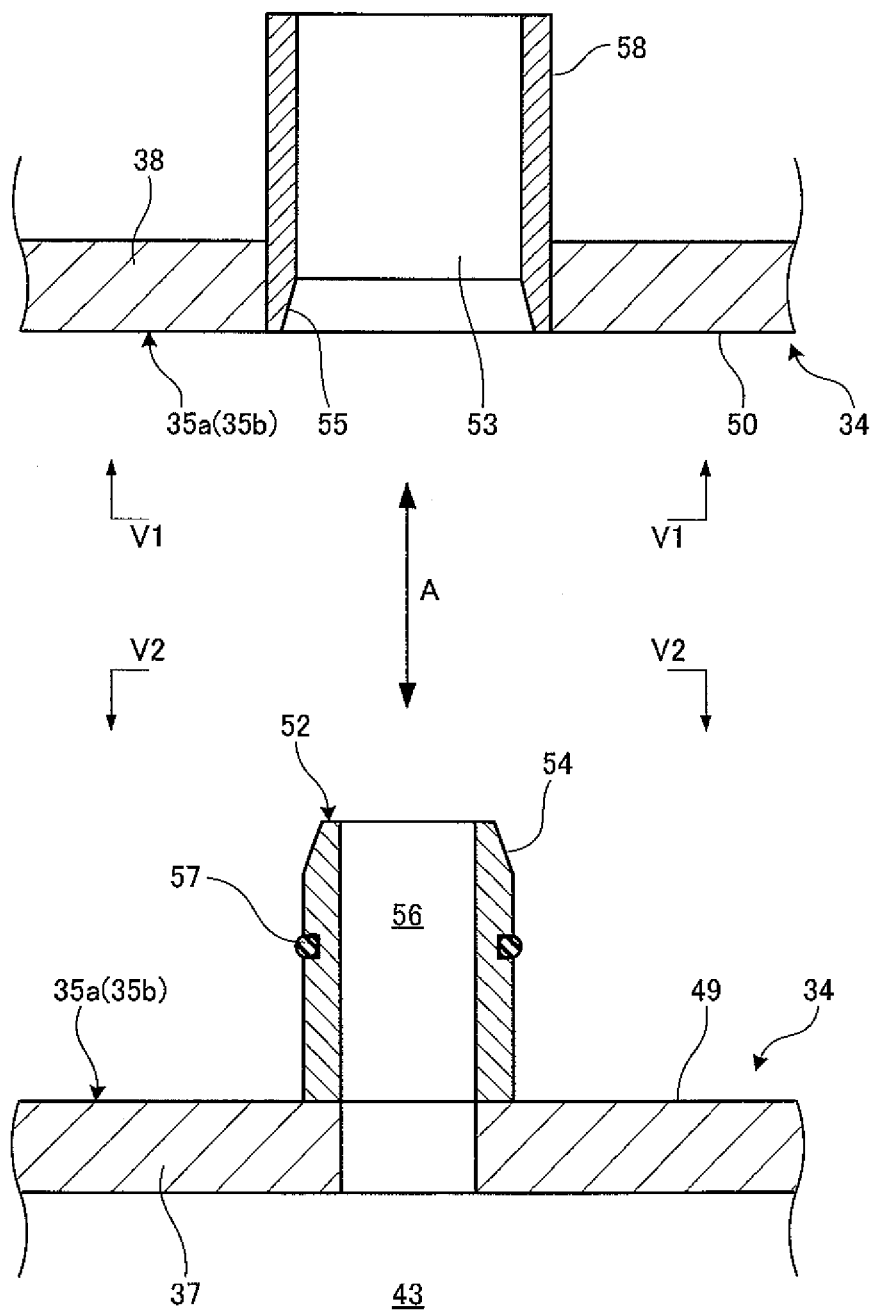
FIG. 7 is a longitudinal sectional view of the coupling portion of the membrane module according to the first embodiment and shows a state in which the fitting projection is pulled out from the fitting hole.

As shown in FIGS. 3 and 6, the water collecting cases 35a and 35b of the lower membrane module 34 are detachably coupled to the water collecting cases 35a and 35b of the upper membrane module 34 (an example of an adjacent different membrane module). A coupling portion 51 includes, as shown in FIG. 7, a cylindrical fitting projection 52 which is provided on the upper coupling surface 49 of each of the water collecting cases 35a and 35b and projects upward and a fitting hole 53 which provided on the lower coupling surface 50.

The fitting projection 52 can be detachably fit into the fitting hole 53 in the up-down direction A. A conical projection inclined surface 54 narrowed in the radial direction toward the distal end (upper end) thereof is formed at the distal end portion (upper end portion) of the fitting projection 52.

The fitting hole 53 is formed in a cylindrical tubular member 58 provided on the lower plate 38. The upper end of the fitting hole 53 is opened to the water collecting space 43 and the lower end of the fitting hole 53 is opened to the lower coupling surface 50. A conical hole inclined surface 55 expanded in the radial direction toward the lower end (an example of the outer end) thereof is formed in the lower end portion (an example of the outer end portion) of the fitting hole 53.

A flow hole 56 opened to the upper end of the fitting projection 52 and the water collecting space 43 is formed in the fitting projection 52 and the upper plate 37. A seal member 57 (e.g., an O ring) for sealing between the inner circumferential surface of the fitting hole 53 and the outer circumferential surface of the fitting projection 52 is provided in the outer circumferential portion of the fitting projection 52.

As shown in FIG. 6, the water collecting space 43 of the lower membrane module 34 communicates with the water collecting space 43 of the upper membrane module 34 via the flow hole 56 of the fitting projection 52. As shown in FIG. 2, water collecting pipes 59 are provided on the left and right outer sides of the top membrane module 34. The fitting projection 52 of the one water collecting case 35a on the left or right of the top membrane module 34 and the one water collecting pipe 59 on the left or right thereof are connected via a connection pipe 60. Similarly, the fitting projection 52 of the other water collecting case 35b on the left or right and the other water collecting pipe 59 on the left or right are connected via the connection pipe 60. A permeate extracting pipe (not shown) is connected to the water collecting pipes 59. A suction pump (not shown) is provided in the permeate extracting pipe.

Gravity filtration with a water head pressure in the treatment tank 32 set as a driving force can also be used for the extraction of permeate.

An air diffuser 62 for diffusing gas such as air is provided below the bottom membrane module 34. The bottom membrane module 34 is supported on an air diffusing case 63 for leading the gas diffused from the air diffuser 62 to the upper membrane modules 34. The fitting holes 53 of the bottom membrane module 34 are closed.

Operations in the configuration are explained below.

The membrane cassette 31 is formed by stacking the plurality of membrane modules 34 on the air diffusing case 63 in the up-down direction A.

When the plurality of membrane modules 34 are stacked as explained above, the fitting projection 52 of the lower membrane module 34 is fit into the fitting hole 53 of the upper membrane module 34 from below to join the upper coupling surface 49 of the lower membrane module 34 and the lower coupling surface 50 of the upper membrane module 34. Consequently, as shown in FIG. 6, the lower membrane module 34 and the upper membrane module 34 adjacent to each other are coupled via the coupling portions 51. It is possible to prevent the upper membrane module 34 from disengaging from the lower membrane module 34 in a front-back direction B and a left-right direction C (an example of a direction orthogonal to the predetermined arrangement direction (the up-down direction A)).

When the fitting projection 52 of the lower membrane module 34 is fit into the fitting hole 53 of the upper membrane module 34 from below, since the projection inclined surface 54 is guided in contact with the hole inclined surface 55, the fitting projection 52 is smoothly and surely fit into the fitting hole 53.

The water collecting spaces 43 of the plurality of upper and lower membrane modules 34 coupled to each other communicate with each other via the flow holes 56 of the coupling portion 51.

As shown in FIG. 2, the fitting projections 52 of the top membrane module 34 and the water collecting pipes 59 are connected via the connection pipes 60. Thereafter, the suction pump and the air diffuser 62 are driven, air is diffused from air diffusing pipes 64, and a filtration operation starts.

Consequently, the insides of the membrane elements 36 are depressurized and sludge or the like in the liquid to be treated 33 is captured by the filtration membranes 47 of the membrane elements 36. Permeate having permeated through the filtration membranes 47 and flowed into the permeate flow channels 48 of the membrane elements 36 flows into the water collecting spaces 43 of the water collecting cases 35a and 35b from the permeate flow channels 48 as treated water.

The permeate (i.e., the treated water) collected in the water collecting spaces 43 of the membrane modules 34 flows from the water collecting space 43 of the lower membrane module 34 to the water collecting space 43 of the upper membrane module 34 through the flow holes 56 of the fitting projections 52 of the coupling portions 51. Finally, the permeate flows from the water collecting space 43 of the top membrane module 34 (an example of the specific membrane module) into the water collecting pipes 59 through the connection pipes 60, flows from the water collecting pipes 59 to the permeate extracting pipe, and is extracted to the outside of the treatment tank 32.

In this way, the coupling portions 51 have the function of separably coupling the lower membrane module 34 and the upper membrane module 34 and the function of causing the water collecting space 43 of the lower membrane module 34 and the water collecting space 43 of the upper membrane module 34 to communicate with each other. Therefore, a pipe or the like used exclusively for causing the water collecting space 43 of the lower membrane module 34 and the water collecting space 43 of the upper membrane module 34 to communicate with each other is unnecessary. The number of components of the membrane module 34 is reduced and the membrane module 34 is reduced in size.

Upflow is generated between the membrane elements 36 by air bubbles diffused from the air diffusing pipes 64. Due to this upflow, it is possible to prevent solids such as sludge from depositing on the membrane surfaces of the membrane elements 36 and suppress a rise in permeation resistance.

In this case, the upper coupling surfaces 49 of the lower membrane module 34 and the lower coupling surfaces 50 of the upper membrane module 34 are in contact with each other. Therefore, it is possible to prevent the air bubbles from leaking out to the outside from between the water collecting cases 35a and 35b of the lower membrane module 34 and the water collecting cases 35a and 35b of the upper membrane module 34.

When the membrane cassette 31 is formed by vertically stacking the plurality of membrane modules 34, the water collecting cases 35a and 35b of the membrane modules 34 form the sidewalls of the membrane cassette 31. Therefore, it is unnecessary to provide sidewalls separately from the water collecting cases 35a and 35b.

In maintenance and inspection, the suction pump and the air diffuser 62 are stopped to stop a filtration operation and the connection pipes 60 are removed from the fitting projections 52 of the top membrane module 34. Thereafter, as shown in FIG. 3, the upper membrane module 34 is lifted from the lower membrane module 34, whereby the fitting projections 52 of the lower membrane module 34 are pulled downward from the fitting holes 53 of the upper membrane module 34. Therefore, it is possible to lift the respective membrane modules 34 having fixed weight one by one to above the treatment tank 32 and remove the membrane modules 34. Consequently, lifting work can be easily performed.

In the maintenance and inspection, the membrane cassette 31 may be removed to the outside from the treatment tank 32 and, thereafter, the respective membrane modules 34 may be lifted one by one.

In the first embodiment, as shown in FIG. 3, one fitting projection 52 is provided on the upper plate 37 of the one water collecting case 35a and one fitting hole 53 is provided on the lower plate 38. However, a plurality of fitting projections 52 and a plurality of fitting holes 53 may be provided. Similarly, in the first embodiment, one fitting projection 52 is provided on the upper plate 37 of the other water collecting case 35b and one fitting hole 53 is provided on the lower plate 38. However, a plurality of fitting projections 52 and a plurality of fitting holes 53 may be provided.

A second embodiment of the present invention is explained on the basis of FIGS. 8 to 11.

Coupling portions 70 include fit-in members 71, upper fitting holes 72 provided in upper coupling surfaces 49 of water collecting cases 35a and 35b, and lower fitting holes 73 provided in lower coupling surfaces 50 of the water collecting cases 35a and 35b.

Figure 11:
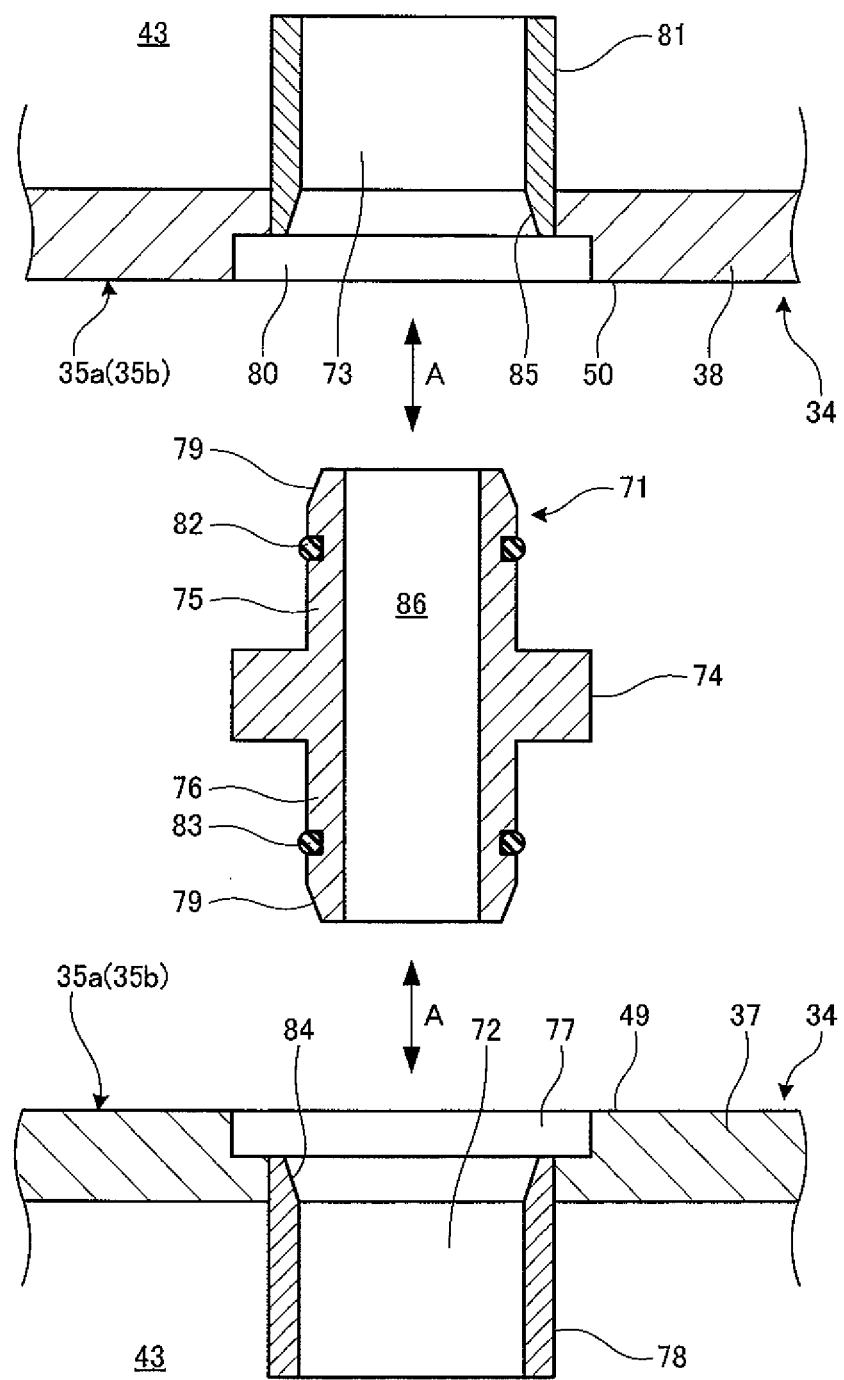
FIG. 11 is a longitudinal sectional view of the coupling portion of the membrane module according to the second embodiment and shows a state in which the fit-in member is disengaged from the fitting hole.

As shown in FIG. 11, the fit-in member 71 includes a disc-like plate portion 74, one fitting projection 75 provided on one side of the plate portion 74, and another fitting projection 76 provided on the other side of the plate portion 74. A flow hole 86 is formed in the fit-in member 71. One end of the flow hole 86 is opened to the distal end (upper end) of the one fitting projection 75. The other end of the flow hole 86 is opened to the distal end (lower end) of the other fitting projection 76.

Conical projection inclined surfaces 79 narrowed in the radial direction toward the distal ends thereof are respectively formed at the distal end portion of the one fitting projection 75 and the distal end portion of the other fitting projection 76.

The upper fitting holes 72 are formed in a cylindrical upper tubular member 78 provided on upper plates 37 of the water collecting cases 35a and 35b. Upper recesses 77 are formed in the upper coupling surfaces 49 of the upper plates 37. The upper ends of the upper fitting holes 72 are opened to the upper recesses 77 and the lower ends of the upper fitting holes 72 are opened to water collecting spaces 43. Conical hole inclined surfaces 84 expanded in the radial direction toward the upper ends thereof are formed in the upper end portions of the upper fitting holes 72.

The lower fitting holes 73 are formed in cylindrical lower tubular members 81 provided in lower plates 38 of the water collecting cases 35a and 35b. Lower recesses 80 are formed in the lower coupling surfaces 50 of the lower plates 38. The lower ends of the lower fitting holes 73 are opened to the lower recesses 80 and the upper ends of the lower fitting holes 73 are opened to the water collecting spaces 43. Conical hole inclined surfaces 85 expanded in the radial direction toward the lower ends thereof are formed in the lower end portions of the lower fitting holes 73.

The one fitting projection 75 of the fit-in member 71 can be detachably fit into the lower fitting hole 73 in an up-down direction A. The upper part of the plate portion 74 can be detachably fit into the lower recess 80. The other fitting projection 76 of the fit-in member 71 can be detachably fit into the upper fitting hole 72 in the up-down direction A. The lower part of the plate portion 74 can be detachably fit into the upper recess 77.

A seal member 82 (e.g., an O ring) for sealing between the inner circumferential surface of the lower fitting hole 73 and the outer circumferential surface of the one fitting projection 75 is provided on the outer circumferential portion of the one fitting projection 75 of the fit-in member 71. A seal member 83 (e.g., an O ring) for sealing between the inner circumferential surface of the upper fitting hole 72 and the outer circumferential surface of the other fitting projection 76 is provided on the outer circumferential portion of the other fitting projection 76.

Figure 8:
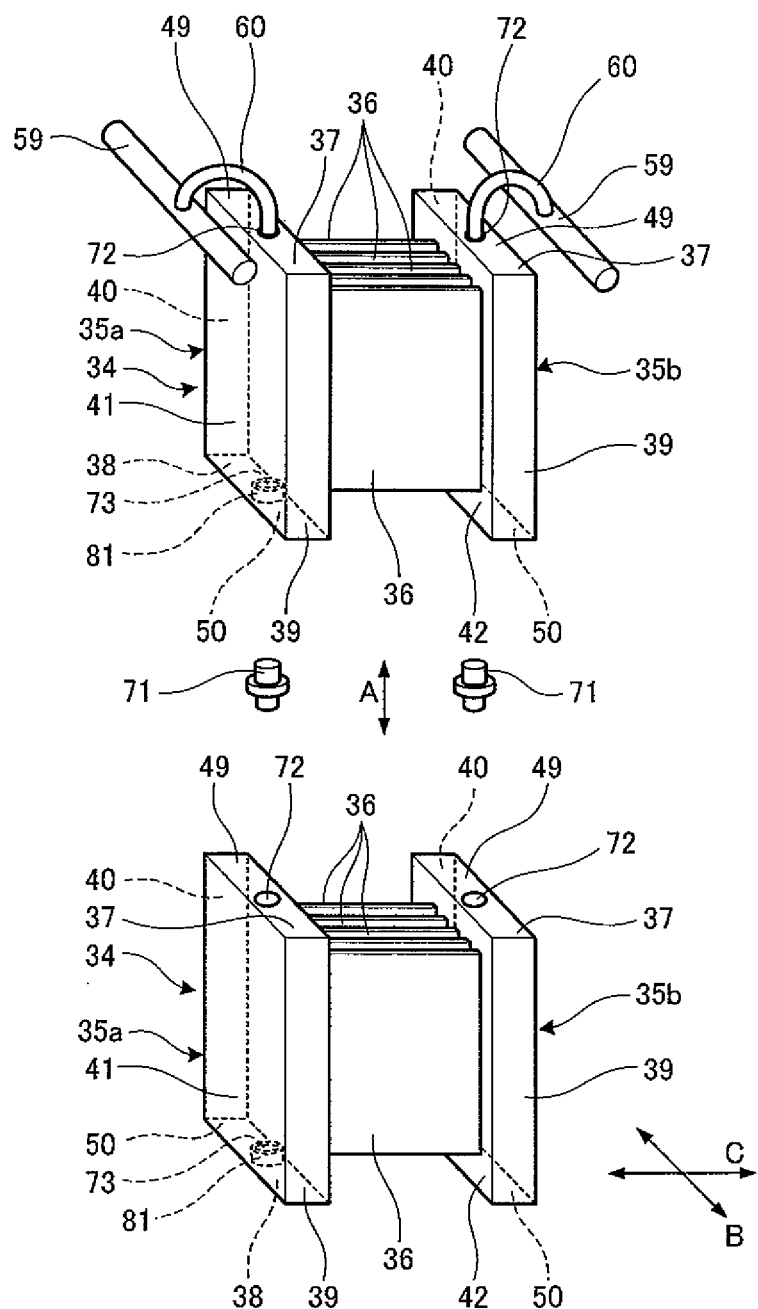
FIG. 8 is a perspective view of a membrane module according to a second embodiment of the present invention.
Figure 9:
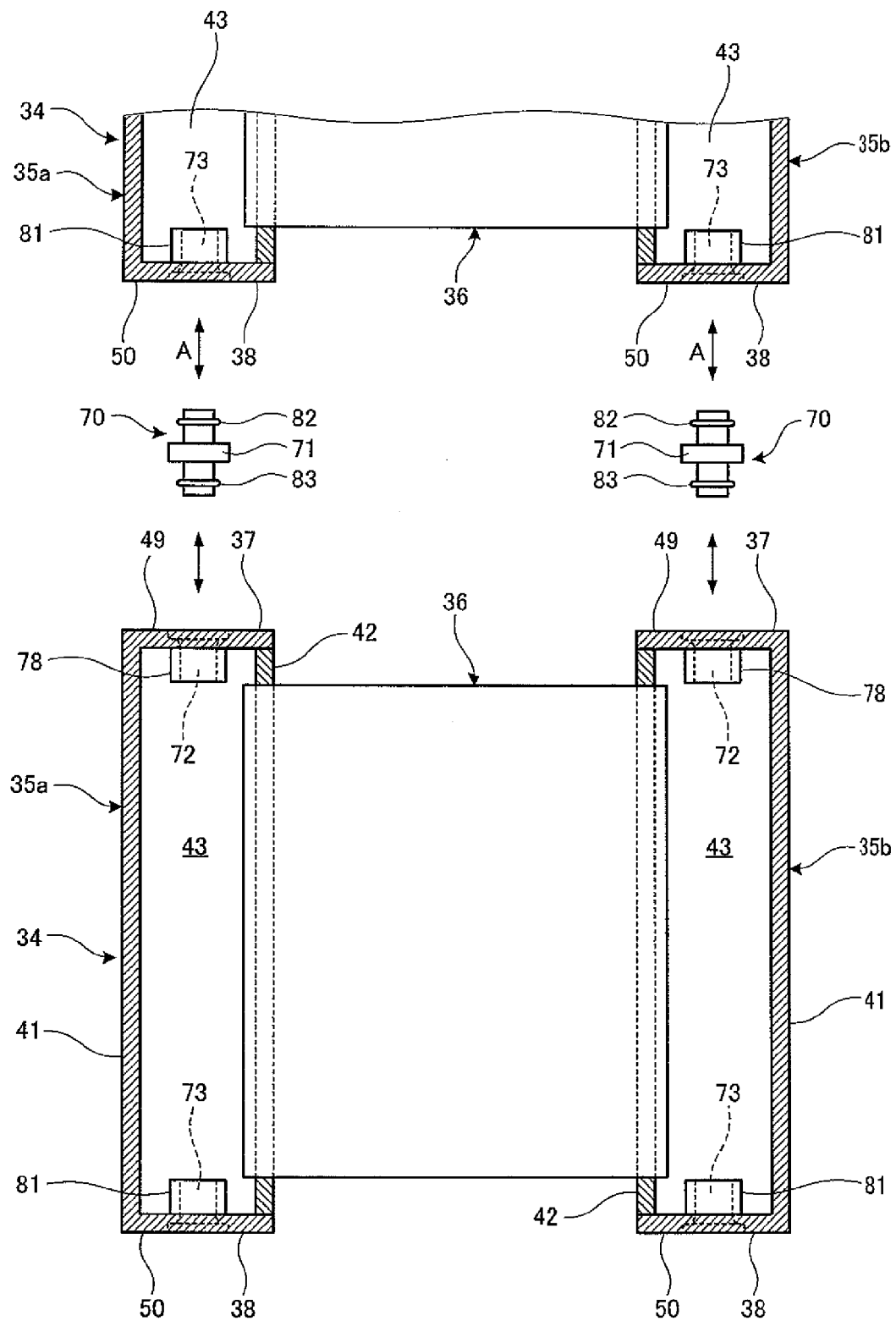
FIG. 9 is a longitudinal sectional view of the membrane module according to the second embodiment.

As shown in FIG. 8, the upper fitting hole 72 of the water collecting case 35a on the left or right of a top membrane module 34 and a water collecting pipe 59 on the left or right are connected via a connection pipe 60. Similarly, the upper fitting hole 72 of the other water collecting case 35b on the left or right and the other water collecting pipe 59 on the left and right are connected via the connection pipe 60. The lower fitting holes 73 of the bottom membrane module 34 are closed.

Operations in the configuration are explained below.

A membrane cassette 31 is formed by stacking a plurality of membrane modules 34 in the up-down direction A.

When the plurality of membrane modules 34 are stacked as explained above, the other fitting projection 76 of the fit-in member 71 is inserted into the upper fitting hole 72 of the lower membrane module 34 and the lower part of the plate portion 74 of the fit-in member 71 is fit into the upper recess 77. In this case, the projection inclined surface 79 of the other fitting projection 76 is guided in contact with a hole inclined surface 84 of the upper fitting hole 72. Therefore, the other fitting projection 76 is smoothly and surely fit into the upper fitting hole 72.

Thereafter, the upper membrane module 34 is lowered onto the lower membrane module 34. In this case, the one fitting projection 75 of the fit-in member 71 is inserted into the lower fitting hole 73 of the upper membrane module 34, the upper part of the plate portion 74 of the fit-in member 71 is fit into the lower recess 80, and the upper coupling surface 49 of the lower membrane module 34 and the lower coupling surface 50 of the upper membrane module 34 are joined. In this case, the projection inclined surface 79 of the one fitting projection 75 is guided in contact with the hole inclined surface 85 of the lower fitting hole 73. Therefore, the one fitting projection 75 is smoothly and surely fit into the lower fitting hole 73.

Figure 10:
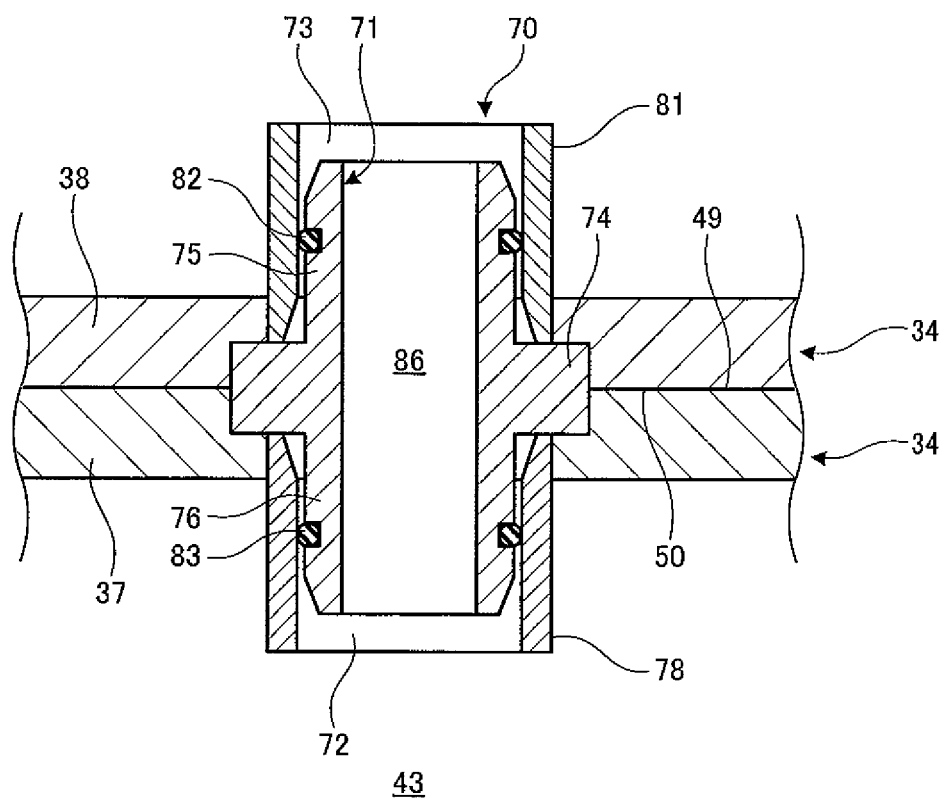
FIG. 10 is a longitudinal sectional view of a coupling portion of the membrane module according to the second embodiment and shows a state in which a fit-in member is fit into a fitting hole.

Consequently, as shown in FIG. 10, the lower membrane module 34 and the upper membrane module 34 adjacent to each other are coupled via the coupling portion 70. It is possible to prevent the upper membrane module 34 from disengaging from the lower membrane module 34 in a front-back direction B and a left-right direction C (an example of the direction orthogonal to the predetermined arrangement direction (up-down direction A)).

The water collecting spaces 43 of the plurality of upper and lower membrane modules 34 coupled to each other communicate with each other via the flow holes 86 of the coupling portions 70.

Permeate (i.e., treated water) collected in the water collecting spaces 43 of the respective membrane modules 34 flow from the water collecting space 43 of the lower membrane module 34 to the water collecting space 43 of the upper membrane module 34 through the flow hole 86 of the fit-in member 71 of the coupling portion 70. Finally, the permeate flows into the water collecting pipes 59 from the water collecting space 43 of the top membrane module 34 (an example of the specific membrane module) through the connection pipes 60, flows from the water collecting pipes 59 to the permeate extracting pipe, and is extracted to the outside of the treatment tank 32.

In this way, the coupling portion 70 has the function of separably coupling the lower membrane module 34 and the upper membrane module 34 and the function of causing the water collecting space 43 of the lower membrane module 34 and the water collecting space 43 of the upper membrane module 34 to communicate with each other. Therefore, a pipe or the like used exclusively for causing the water collecting space 43 of the lower membrane module 34 and the water collecting space 43 of the upper membrane module 34 to communicate with each other is unnecessary. The number of components of the membrane module 34 is reduced and the membrane module 34 is reduced in size.

In the second embodiment, as shown in FIG. 8, one upper fitting hole 72 is provided in the upper plate 37 of the one water collecting case 35a, one lower fitting hole 73 is provided in the lower plate 38, and the upper fitting hole 72 and the lower fitting hole 73 are coupled by using one fit-in member 71. However, a plurality of upper fitting holes 72 and a plurality of lower fitting holes 73 may be provided and coupled by using a plurality of fit-in members 71. Similarly, in the second embodiment, one upper fitting hole 72 is provided in the upper plate 37 of the other water collecting case 35b, one lower fitting hole 73 is provided in the lower plate 38, and the upper fitting hole 72 and the lower fitting hole 73 are coupled by using one fit-in member 71. However, a plurality of upper fitting holes 72 and a plurality of lower fitting holes 73 may be provided and coupled by using a plurality of fit-in members 71.

A third embodiment of the present invention is explained on the basis of FIGS. 12 to 18.

Figure 14A:
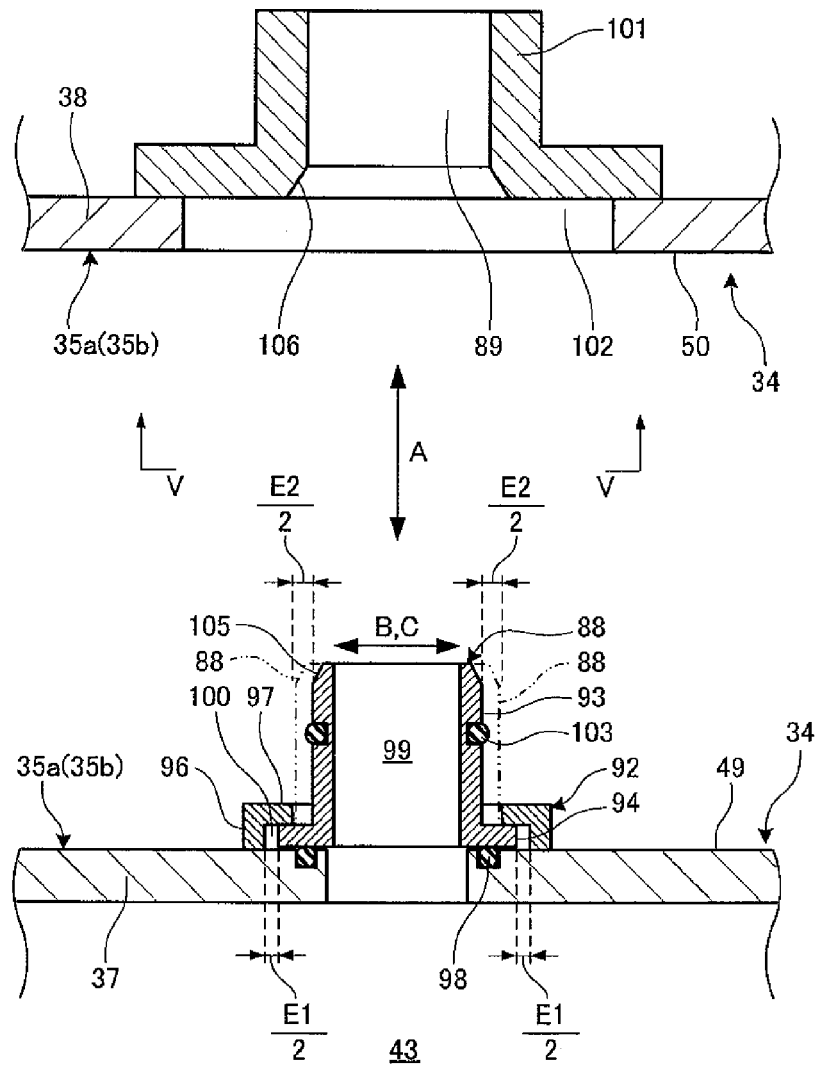
FIG. 14 is a longitudinal sectional view of a coupling portion of the membrane module according to the third embodiment and shows a state in which a fitting projection is pulled out from a fitting hole.
Figure 14B:
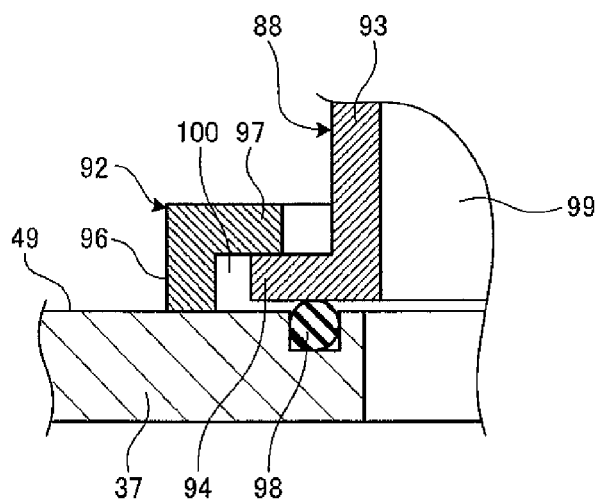
Figure 15:
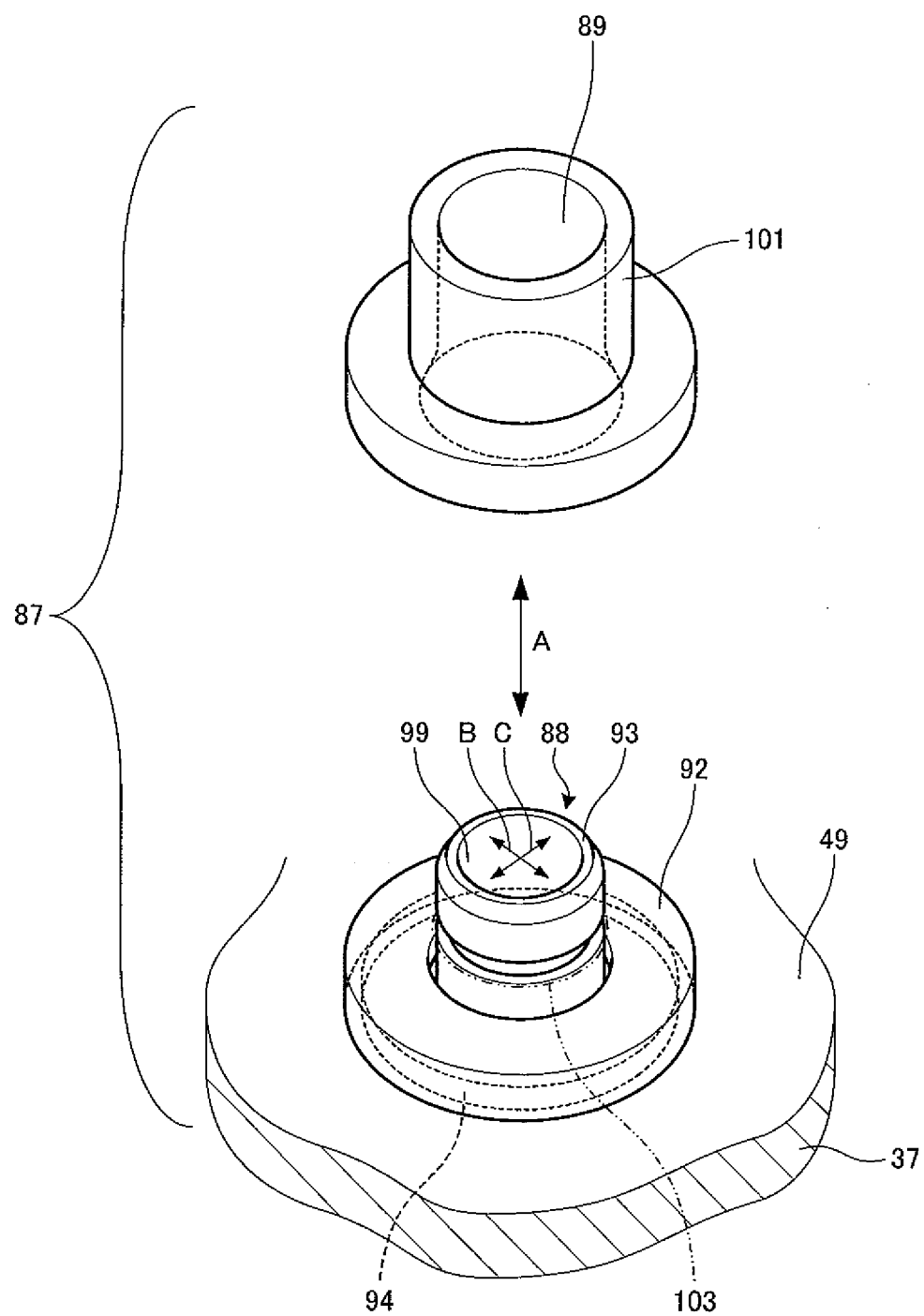
FIG. 15 is a perspective view of the coupling portion of the membrane module according to the third embodiment and shows a state in which the fitting projection is pulled out from the fitting hole.
Figure 16:
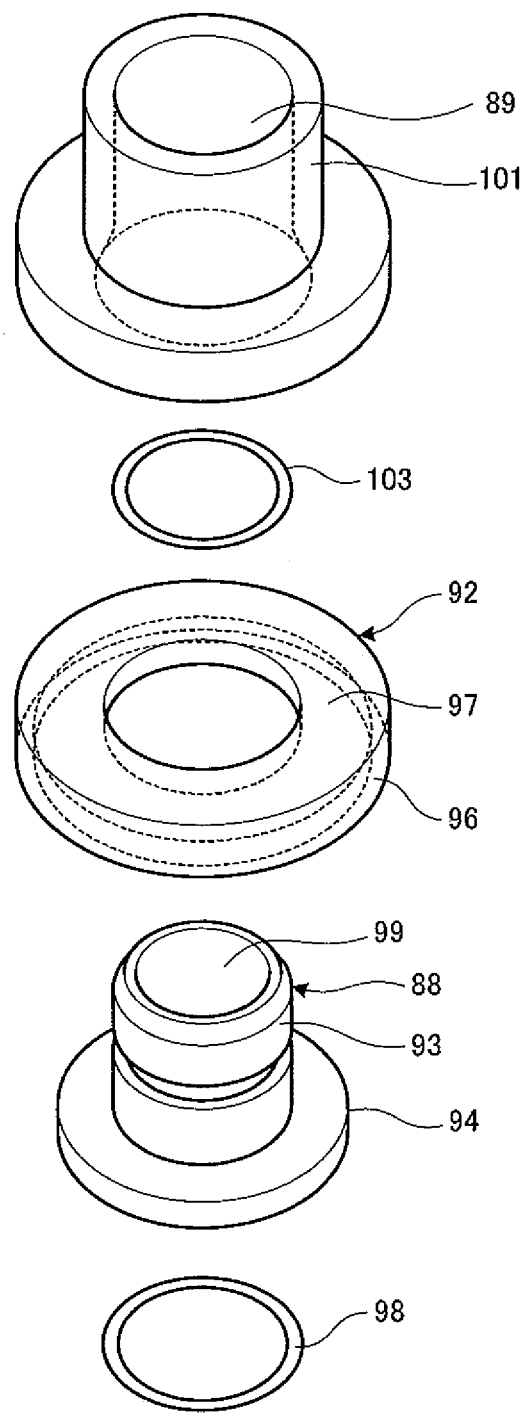
FIG. 16 is an exploded perspective view of the coupling portion of the membrane module according to the third embodiment.

As shown in FIGS. 14 to 16, a coupling portion 87 includes a fitting projection 88, a fitting hole 89, a holding member 92 (an example of a holding mechanism), and a flow hole 99. The fitting projection 88 is held on an upper coupling surface 49 of each of water collecting cases 35a and 35b, projects upward and is slidable (displaceable) in a front-back direction B and a left-right direction C (an example of a direction orthogonal to a predetermined arrangement direction (an up-down direction A)) with respect to the upper coupling surface 49. The fitting projection 88 includes a cylinder portion 93 and an outer brim portion 94 provided on the lower end outer circumferential surface of the cylinder portion 93 and projecting to an outer side in the radial direction. A conical projection inclined surface 105 narrowed in the radial direction toward the upper end thereof is formed in the upper end portion of the cylinder portion 93. The flow hole 99 is formed in the fitting projection 88 and an upper plate 37 and opened to the upper end of the fitting projection 88 and a water collecting space 43.

The holding member 92 holds the fitting projection 88 to be slidable within a predetermined range in the front-back and left-right directions B and C. The holding member 92 includes an annular circumferential wall portion 96 vertically provided on the upper coupling surface 49 of each of the water collecting cases 35a and 35b and an annular inner brim portion 97 projecting from the upper end portion of the circumferential wall portion 96 to an inner side in the radial direction.

The outer brim portion 94 is inserted in a holding space 100 formed between the upper plate 37 and the inner brim portion 97 of each of the water collecting cases 35a and 35b. The outer brim portion 94 is restrained in the up-down direction A in a state in which the outer brim portion 94 is pressed at a proper pressure against the upper coupling surface 49 and the lower surface of the inner brim portion 97.

The outer diameter of the outer brim portion 94 is set smaller than the inner diameter of the circumferential wall portion 96 and larger than the inner diameter of the inner brim portion 97. The outer diameter of the cylinder portion 93 of the fitting projection 88 is set smaller than the inner diameter of the inner brim portion 97.

A range obtained by subtracting the outer diameter of the outer brim portion 94 of the fitting projection 88 from the inner diameter of the circumferential wall portion 96 of the holding member 92 is represented as E1. A range obtained by subtracting the outer diameter of the cylinder portion 93 of the fitting projection 88 from the inner diameter of the inner brim portion 97 of the holding member 92 is represented as E2. Displacement amounts in the front-back and left-right directions B and C of the fitting projection 88 are regulated to smaller one (an example of the predetermined range) of the ranges E1 and E2.

A seal member 98 (an O ring, etc.) for sealing between the upper coupling surface 49 and the lower end face of the fitting projection 88 is provided on the upper plate 37 of each of the water collecting cases 35a and 35b. Water tightness is secured by this seal member 98 when the fitting projection 88 slides in the front-back and left-right directions B and C with respect to the upper coupling surface 49. As shown in FIG. 14(b), the fitting projection 88 is supported by the seal member 98 while having a slight space above the upper coupling surface 49.

The seal member 98 only has to seal a space between the upper plate 37 and the fitting projection 88. Therefore, the seal member 98 may be provided on the upper surface or the lower surface of the outer brim portion 94 or the lower surface of the inner brim portion 97.

The fitting hole 89 is formed in a tubular member 101 provided in a lower plate 38 of each of the water collecting cases 35a and 35b. A recess 102 is formed in a lower coupling surface 50 of the lower plate 38. The lower end of the fitting hole 89 is opened to the recess 102 and the upper end of the fitting hole 89 is opened to the water collecting space 43. A conical hole inclined surface 106 expanded in the radial direction toward the lower end thereof (an example of an outer end) is formed in the lower end portion of the fitting hole 89 (an example of an outer end portion).

The fitting projection 88 can be detachably fit into the fitting hole 89 in the up-down direction A. A seal member 103 (e.g., an O ring) for sealing between the outer circumferential surface of the cylinder portion 93 and the inner circumferential surface of the fitting hole 89 is provided on the fitting projection 88.

As shown in FIG. 12, the fitting projection 88 of the coupling portion 87 of the one water collecting case 35a on the left or right of a top membrane module 34 and one water collecting pipe 59 on the left or right thereof are connected via a connection pipe 60. Similarly, the fitting projection 88 of the coupling portion 87 of the other water collecting case 35b on the left or right thereof and the other water collecting pipe 59 on the left or right thereof are connected via the connection pipe 60. The fitting holes 89 of a bottom membrane module 34 are closed.

Operations in the configuration are explained below.

Figure 17:
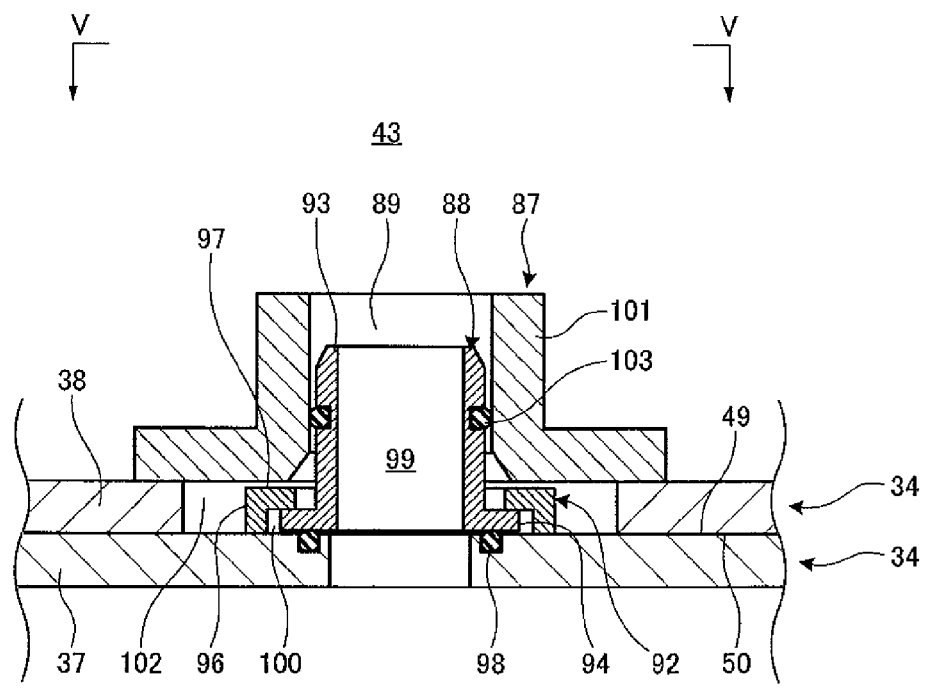
FIG. 17 is a longitudinal sectional view of the coupling portion of the membrane module according to the third embodiment and shows a state in which the fitting projection is fit into the fitting hole.
Figure 18:
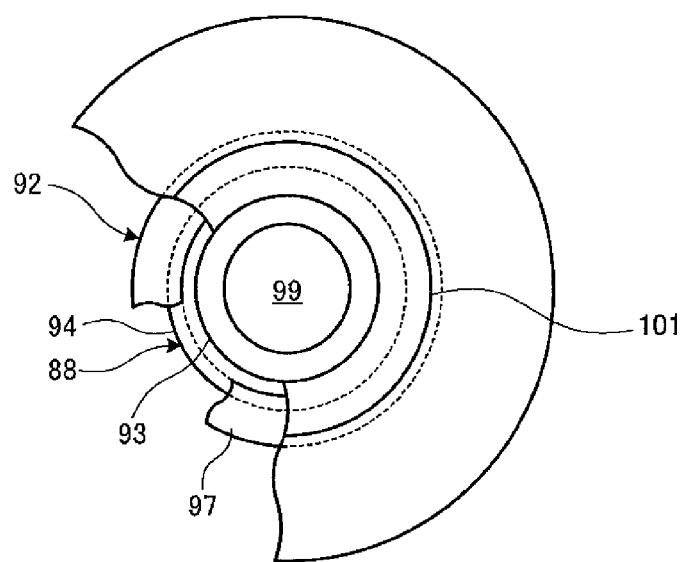
FIG. 18 is a view taken along arrows V-V of FIG. 17.

When the plurality of membrane modules 34 are vertically stacked, the fitting projection 88 of the coupling portion 87 of the lower membrane module 34 is fit into the fitting hole 89 of the upper membrane module 34 from below to join the upper coupling surface 49 of the lower membrane module 34 and the lower coupling surface 50 of the upper membrane module 34. Consequently, as shown in FIG. 17, the lower membrane module 34 and the upper membrane module 34 adjacent to each other are coupled via the coupling portions 87. It is possible to prevent the upper membrane module 34 from disengaging from the lower membrane module 34 in the front-back direction B and the left-right direction C (an example of the direction orthogonal to the predetermined arrangement direction (the up-down direction A)).

In this way, it is possible to easily couple the plurality of upper and lower membrane modules 34 to form a membrane cassette 31. The water collecting spaces 43 of the plurality of upper and lower membrane modules 34 coupled to each other communicate with each other via the flow holes 99 of the coupling portions 87.

After the plurality of upper and lower membrane modules 34 are coupled as explained above to form the membrane cassette 31, a filtration operation is started. Consequently, permeate (i.e., treated water) collected in the water collecting spaces 43 of the respective membrane modules 34 flow from the water collecting space 43 of the lower membrane module 34 to the water collecting space 43 of the upper membrane module 34 through the flow holes 99 of the coupling portions 87. Finally, the permeate flows into the water collecting pipes 59 from the water collecting space 43 of the top membrane module 34 (an example of the specific membrane module) through the connection pipes 60, flows from the water collecting pipes 59 to a permeate extracting pipe, and is extracted to the outside of a treatment tank 32.

Figure 13:
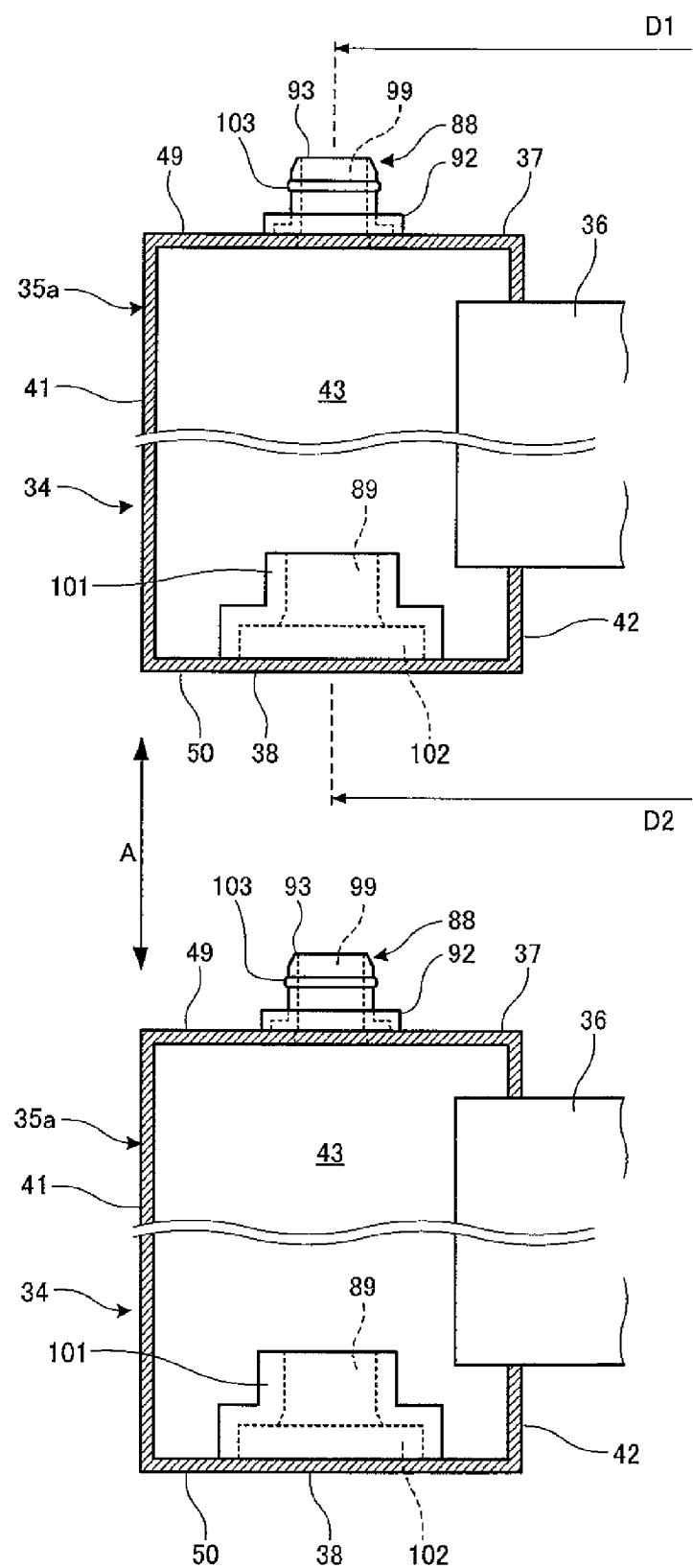
FIG. 13 is a longitudinal sectional view of one of left and right water collecting cases of the membrane module according to the third embodiment.

The filtration operation is stopped and the upper membrane module 34 is lifted from the lower membrane module 34. Consequently, as shown in FIGS. 12 to 14, the fitting projections 88 of the coupling portions 87 of the lower membrane module 34 are pulled downward from the fitting holes 89 of the upper membrane module 34. Consequently, it is possible to remove and separate the upper membrane module 34 from the lower membrane module 34.

In some cases, the dimensions of the membrane module 34 are different between during manufacture and after use, because of contained water, a temperature change and the like due to the use in a liquid to be treated 33. An error may occur between a space D1 (see FIG. 12) between the fitting projection 88 of the one water collecting case 35a and the fitting projection 88 of the other water collecting case 35b and a space D2 (see FIG. 12) between the fitting hole 89 of the one water collecting case 35a and the fitting hole 89 of the other water collecting case 35b.

In such a case, when the membrane module 34 already used and the membrane module 34 not used are vertically stacked and coupled via the coupling portions 87, as indicated by an imaginary line of FIG. 14, the fitting projection 88 of the lower membrane module 34 slides in the front-back direction B or the left-right direction C to be displaced while keeping water tightness with the upper coupling surface 49. Consequently, the error between the space D1 between the left and right fitting projections 88 and the space D2 between the left and right fitting holes 89 is absorbed. It is possible to surely insert the fitting projections 88 of the lower membrane module 34 into the fitting holes 89 of the upper membrane module 34.

In the third embodiment, as shown in FIG. 12, one fitting projection 88 is provided on the upper plate 37 of the one water collecting case 35a and one fitting hole 89 is provided on the lower plate 38. However, a plurality of fitting projections 88 and a plurality of fitting holes 89 may be provided. Similarly, in the third embodiment, one fitting projection 88 is provided on the upper plate 37 of the other water collecting case 35b and one fitting hole 89 is provided on the lower plate 38. However, a plurality of fitting projections 88 and a plurality of fitting holes 89 may be provided.

In the third embodiment, the plurality of membrane modules 34 are coupled via the coupling portions 87. However, besides the membrane modules 34, the structure of the coupling portion 87 may be applied to, for example, the structure of a joint for connecting pipes.

When the membrane modules 34 are stacked and coupled by using a crane or the like, it is necessary to align the positions of the fitting projections 88 of the lower membrane module 34 and the positions of the fitting holes 89 of the upper membrane module 34. In this case, since the fitting projections 88 can be displaced in the front-back and left-right directions B and C and the projection inclined surfaces 105 are guided in contact with the hole inclined surfaces 106, if the positions of the fitting projections 88 and the positions of the fitting holes 89 are aligned to some degree, it is possible to couple the membrane modules 34 and adjust the positions later.

A fourth embodiment of the present invention is explained on the basis of FIGS. 19 to 25.

As shown in FIGS. 19 to 22, a coupling portion 110 includes a fitting projection 111, a fitting hole 112, a holding mechanism 116, and a flow hole 117.

The fitting projection 111 is held by an upper coupling surface 49 of each of water collecting cases 35a and 35b, projects upward and is slidably (displaceable) in a front-back direction B and a left-right direction C (an example of a direction orthogonal to a predetermined arrangement direction (an up-down direction A)) with respect to the upper coupling surface 49.

The fitting projection 111 includes a cylinder portion 123, a brim portion 124 which is provided on the lower end outer circumferential surface of the cylinder portion 123 and projects to an outer side in the radial direction, and holding pawls 125 provided in two places in the outer circumferential portion of the brim portion 124. A conical projection inclined surface 133 narrowed in the radial direction toward the upper end thereof is formed in the upper end portion of the cylinder portion 123. The flow hole 117 is formed in the fitting projection 111 and an upper plate 37 and opened to the upper end of the fitting projection 111 and a water collecting space 43.

The holding mechanism 116 slidably holds the fitting projection 111 within a predetermined range in the front-back and left-right directions B and C. The holding mechanism 116 includes a circumferential wall portion 119, insertion grooves 120, holding grooves 121, and the holding pawls 125. The circumferential wall portion 119 has a cylindrical shape and is vertically provided on the upper coupling surface 49 of each of the water collecting cases 35a and 35b.

The insertion grooves 120 are formed in two places of the circumferential wall portion 119 in the up-down direction A (an axis direction) and reach the upper coupling surface 49 from the upper end of the circumferential wall portion 119. The holding grooves 121 are formed in the circumferential direction from the lower end portions of the insertion grooves 120. These holding grooves 121 face the upper coupling surface 49. The one end portions of the holding grooves 121 communicate with the lower end portions of the insertion grooves 120.

The lower part of the fitting projection 111 is inserted into the inner side of the circumferential wall portion 119. As indicated by a solid line of FIG. 21, the holding pawls 125 are respectively inserted into the holding grooves 121 from the insertion grooves 120. Consequently, the fitting projection 111 is restrained in the up-down direction A (the axis direction) in a state in which the fitting projection 111 is pressed at a proper pressure toward the upper coupling surface 49.

The outer diameter of the brim portion 124 is set smaller than the inner diameter of the circumferential wall portion 119. Consequently, the fitting projection 111 is held to be displaceable in the front-back and left-right directions B and C (the radial direction of the fitting projection 111) with respect to the upper coupling surface 49. Displacement amounts in the front-back and left-right directions B and C of the fitting projection 111 are regulated to a range (an example of the predetermined range) obtained by subtracting the outer diameter of the brim portion 124 from the inner diameter of the circumferential wall portion 119.

Figure 20A:
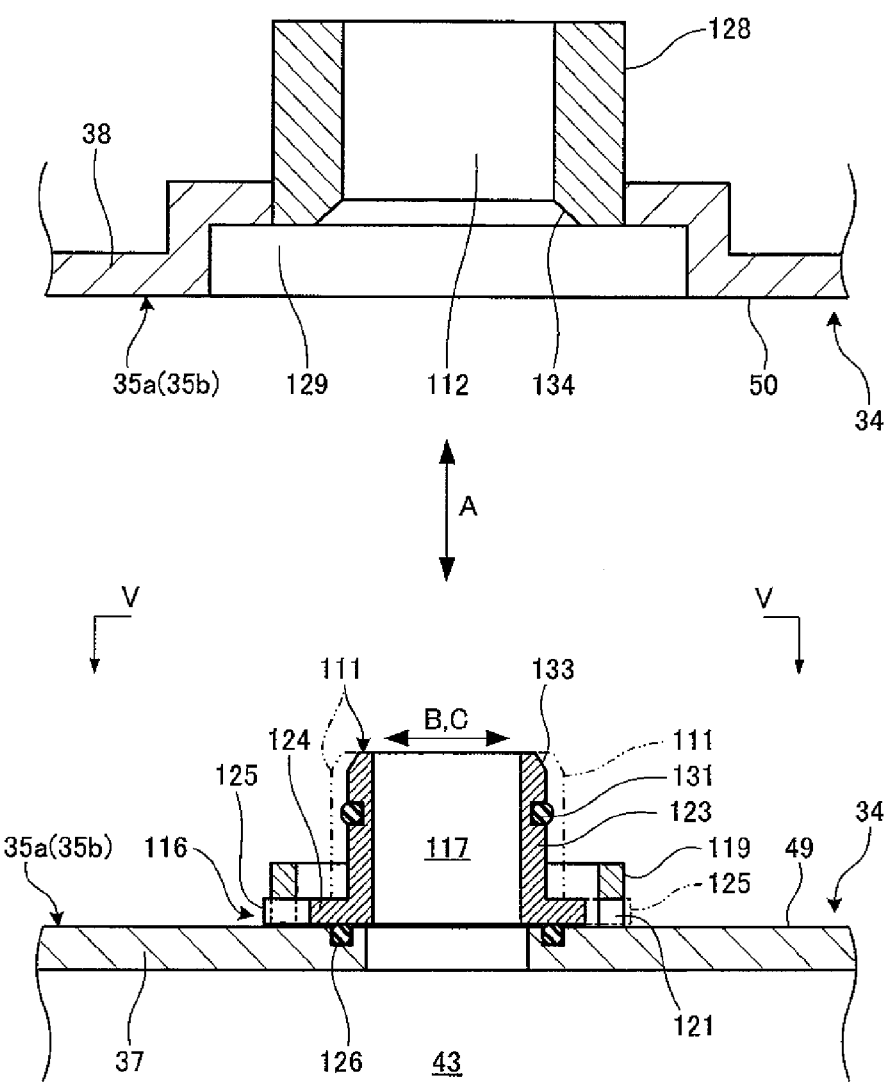
FIG. 20 is a longitudinal sectional view of a coupling portion of the membrane module according to the fourth embodiment and shows a state in which a fitting projection is pulled out from a fitting hole.
Figure 20B:
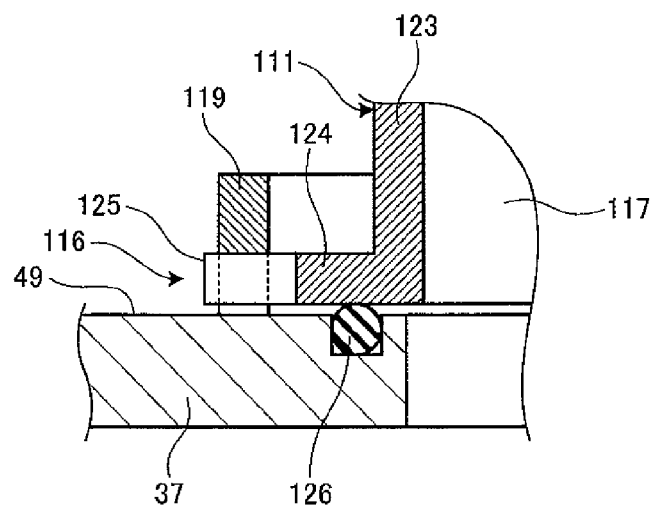
Figure 21:
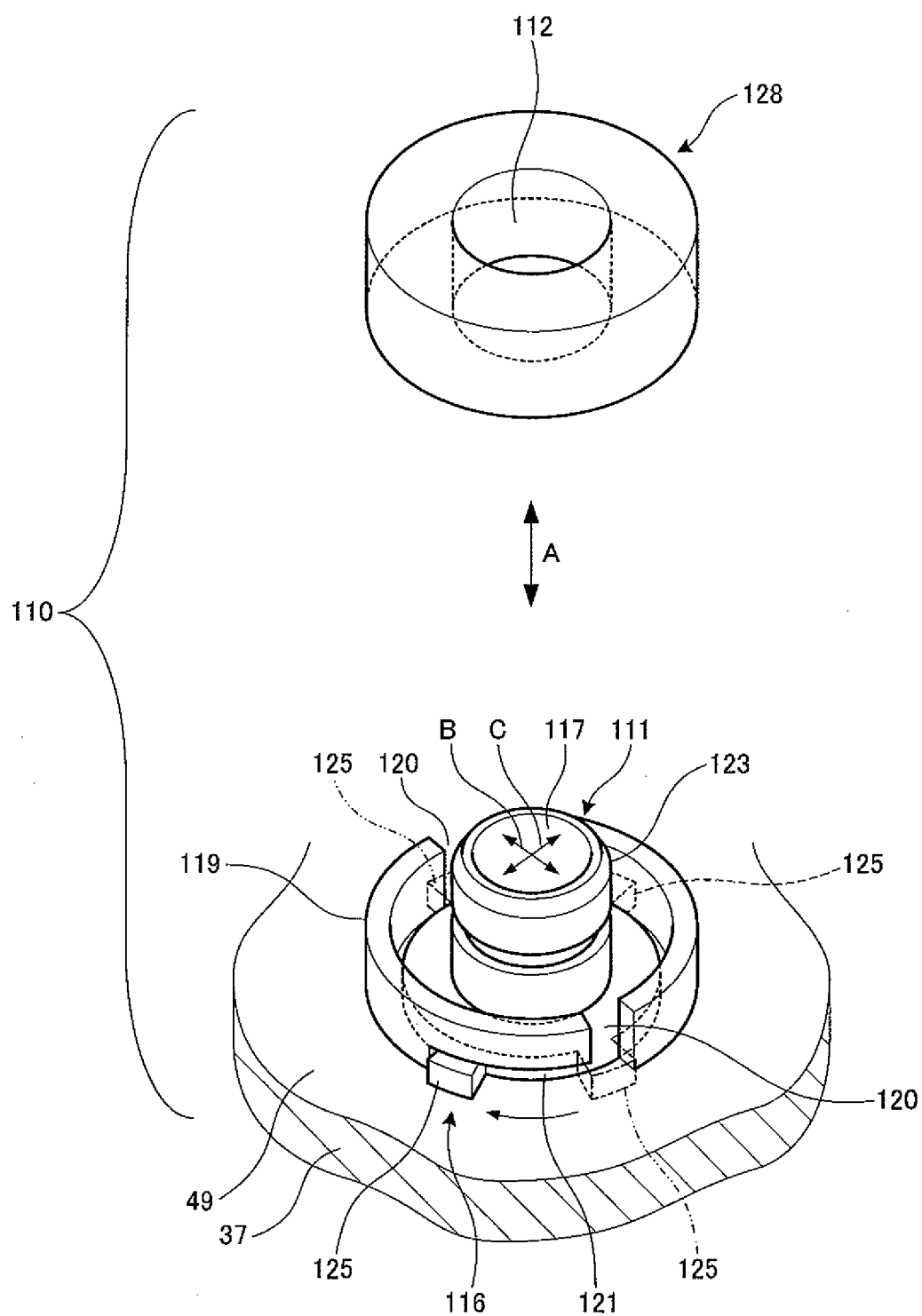
FIG. 21 is a perspective view of the coupling portion of the membrane module according to the fourth embodiment and shows the state in which the fitting projection is pulled out from the fitting hole.

A seal member 126 (an O ring, etc.) for sealing between the upper coupling surface 49 and the lower end surface of the fitting projection 111 is provided on the upper plate 37 of each of the water collecting cases 35a and 35b. Water tightness is secured by this seal member 126 when the fitting projection 111 slides in the front-back and left-right directions B and C with respect to the upper coupling surface 49. As shown in FIG. 20(b), the fitting projection 111 is supported by the seal member 126 while having a slight space above the upper coupling surface 49.

The seal member 126 only has to be capable of sealing a space between the upper plate 37 and the fitting projection 111. Therefore, the seal member 126 may be provided on the lower surface of the fitting projection 111.

The fitting hole 112 is formed in a tubular member 128 provided on a lower plate 38 of each of the water collecting cases 35a and 35b. A recess 129 is formed in a lower coupling surface 50 of the lower plate 38. The lower end of the fitting hole 112 is opened to the recess 129. The upper end of the fitting hole 112 is opened to the water collecting space 43. A conical hole inclined surface 134 expanded in the radial direction toward the lower end thereof (an example of an outer end) is formed in the lower end portion of the fitting hole 112 (an example of an outer end portion).

The fitting projection 111 can be detachably fit into the fitting hole 112 in the up-down direction A (an example of the predetermined arrangement direction). A seal member 131 (e.g., an l ring) for sealing between the outer circumferential surface of the cylinder portion 123 and the inner circumferential surface of the fitting hole 112 is provided on the cylinder portion 123 of the fitting projection 111.

Figure 19:
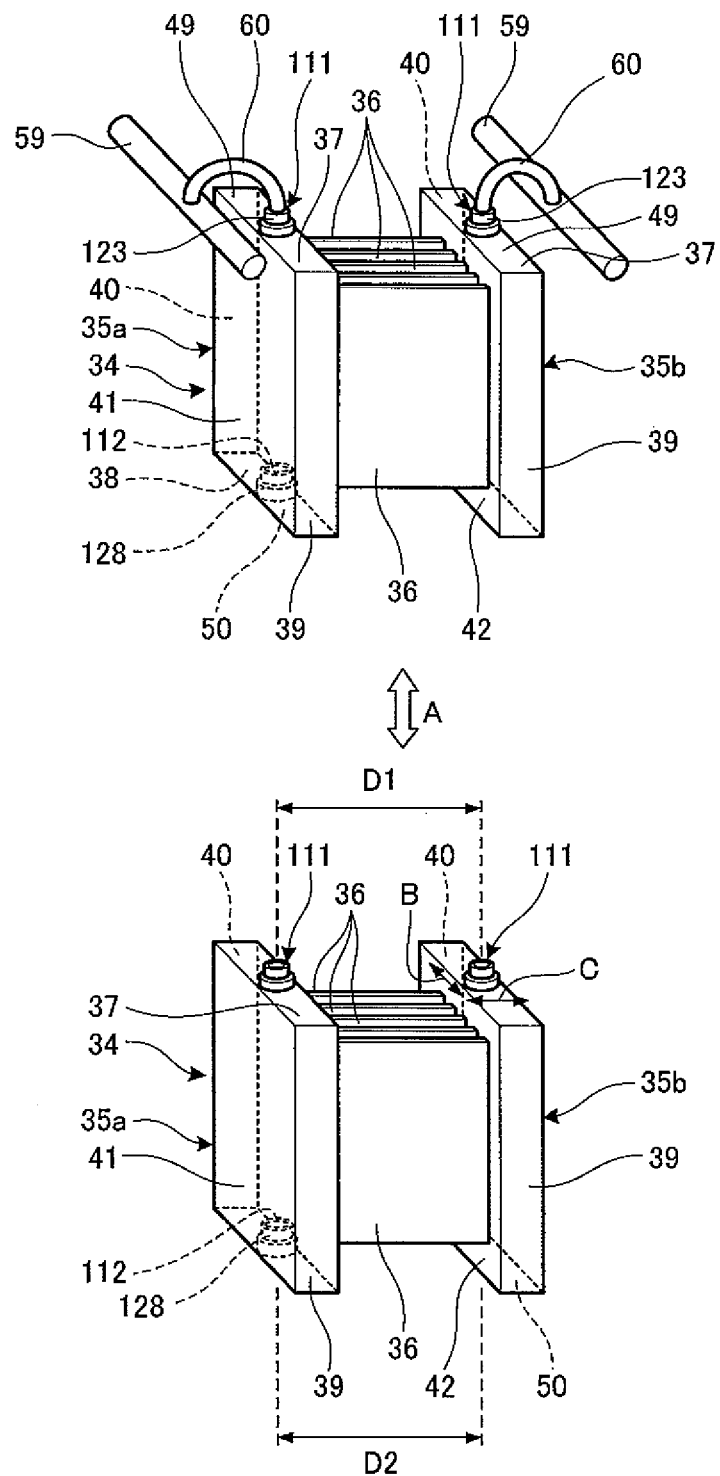
FIG. 19 is a perspective view of a membrane module according to a fourth embodiment of the present invention.

As shown in FIG. 19, the fitting projection 111 of the one water collecting case 35a on the left or right of a top membrane module 34 and one water collecting pipe 59 on the left or right thereof are connected via a connection pipe 60. Similarly, the fitting projection 111 of the other water collecting case 35b on the left or right thereof and the other water collecting pipe 59 on the left or right thereof are connected via the connection pipe 60. The fitting holes 112 of a bottom membrane module 34 are closed.

Operations in the configuration are explained below.

Figure 24:
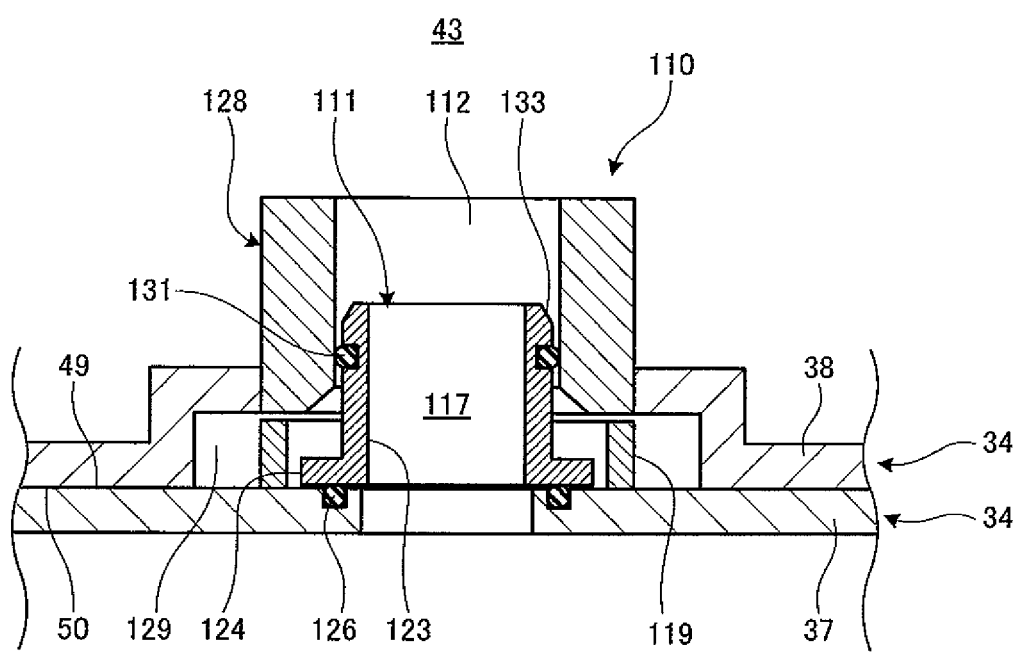
FIG. 24 is a view taken along arrows V1-V1 of FIG. 23.
Figure 25:
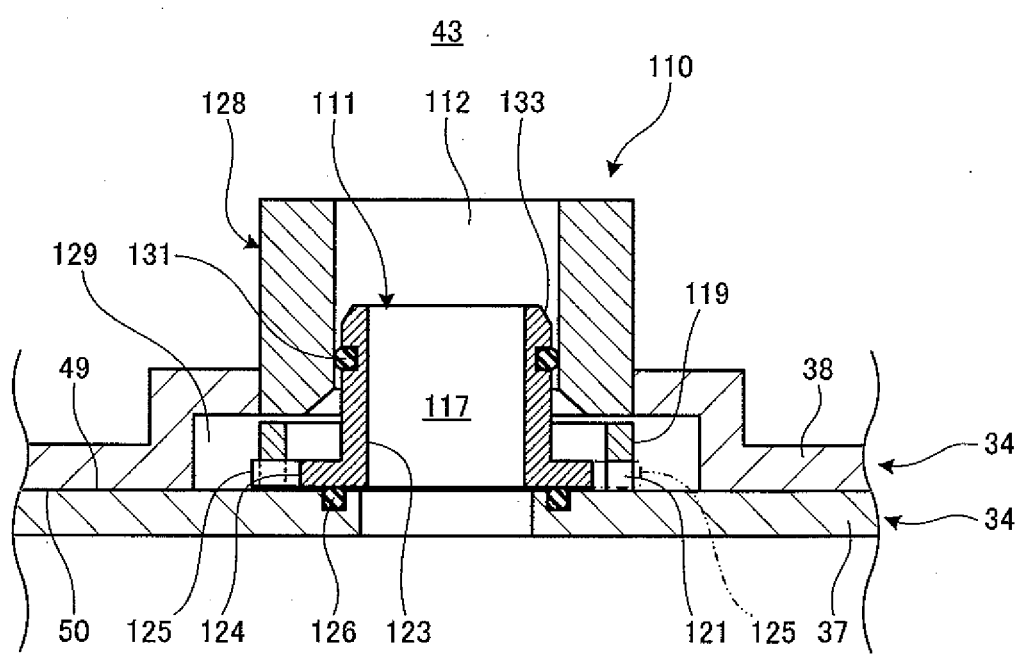
FIG. 25 is a view taken along arrows V2-V2 of FIG. 23.

When a plurality of membrane modules 34 are vertically stacked, as shown in FIGS. 24 and 25, the fitting projection 111 of the lower membrane module 34 is fit in the fitting hole 112 of the upper membrane module 34 from below to join the upper coupling surface 49 of the lower membrane module 34 and the lower coupling surface 50 of the upper membrane module 34. Consequently, the lower membrane module 34 and the upper membrane module 34 adjacent to each other are coupled via the coupling portions 110. It is possible to prevent the upper membrane module 34 from disengaging from the lower membrane module 34 in the front-back direction B and the left-right direction C (an example of a direction orthogonal to the predetermined arrangement direction (the up-down direction A)).

In this way, it is possible to easily couple the plurality of upper and lower membrane modules 34 to form a membrane cassette 31. The water collecting spaces 43 of the plurality of upper and lower membrane modules 34 coupled to each other communicate with each other via the flow holes 117 of the coupling portion 110.

The plurality of upper and lower membrane modules 34 are coupled as explained above to form the membrane cassette 31 and a filtration operation is started. Consequently, permeate (i.e., treated water) collected in the water collecting spaces 43 of the respective membrane modules 34 flows from the water collecting space 43 of the lower membrane module 34 to the water collecting space 43 of the upper membrane module 34 through the flow holes 117 of the coupling portions 110. Finally, the permeate flows into the water collecting pipes 59 from the water collecting space 43 of the top membrane module (the specific membrane module) through the connection pipes 60, flows from the water collecting pipes 59 to a permeate water extracting pipe, and is extracted to the outside of a treatment tank 32.

The filtration operation is stopped and the upper membrane module 34 is lifted from the lower membrane module 34. Consequently, as shown in FIG. 20, the fitting projections 111 of the lower membrane module 34 are pulled downward from the fitting holes 112 of the upper membrane module 34. Consequently, it is possible to remove and separate the upper membrane module 34 from the lower membrane module 34.

In some cases, the dimensions of the membrane module 34 are different between during manufacture and after use, because of contained water, a temperature change and the like due to the use in a liquid to be treated 33. An error may occur between a space D1 (see FIG. 19) between the fitting projection 111 of the one water collecting case 35a and the fitting projection 111 of the other water collecting case 35b and a space D2 (see FIG. 19) between the fitting hole 112 of the one water collecting case 35a and the fitting hole 112 of the other water collecting case 35b.

In such a case, when the membrane module 34 already used and the membrane module 34 not used are vertically stacked and coupled via the coupling portions 110, as indicated by an imaginary line of FIG. 20, the fitting projection 111 of the lower membrane module 34 slides in the front-back direction B or the left-right direction C to be displaced while keeping water tightness with the upper coupling surface 49. The holding pawls 125 move in the holding grooves 121. Consequently, the error between the space D1 between the left and right fitting projections 111 and the space D2 between the left and right fitting holes 112 is absorbed. It is possible to surely insert the fitting projections 111 of the lower membrane module 34 into the fitting holes 112 of the upper membrane module 34 from below.

In the fourth embodiment, as shown in FIG. 19, one fitting projection 111 is provided on the upper plate 37 of the one water collecting case 35a and one fitting hole 112 is provided on the lower plate 38. However, a plurality of fitting projections 111 and a plurality of fitting holes 112 may be provided. Similarly, in the fourth embodiment, one fitting projection 111 is provided on the upper plate 37 of the other water collecting case 35b and one fitting hole 112 is provided on the lower plate 38. However, a plurality of fitting projections 111 and a plurality of fitting holes 112 may be provided.

Figure 22:
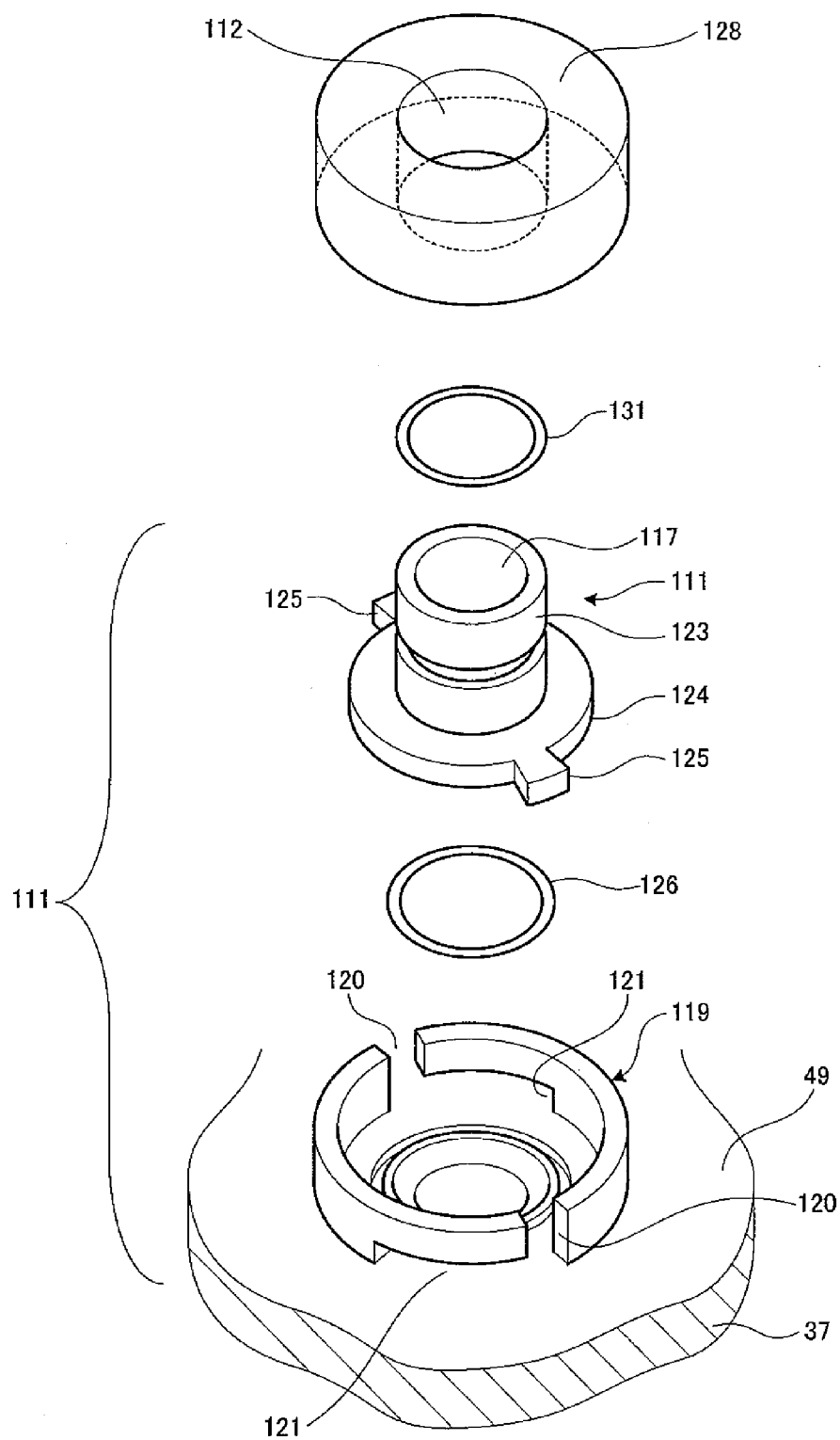
FIG. 22 is an exploded perspective view of the coupling device of the membrane module according to the fourth embodiment.
Figure 23:
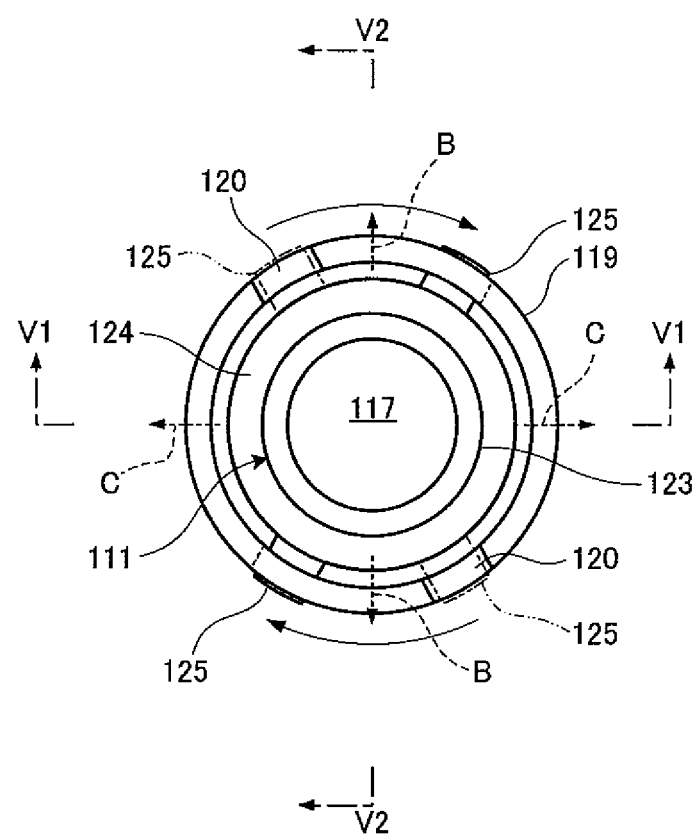
FIG. 23 is a view taken along arrows V-V of FIG. 20.

In the fourth embodiment, as shown in FIG. 22, the insertion grooves 120 and the holding grooves 121 are formed in the two places of the circumferential wall portion 119. However, the insertion grooves 120 and the holding grooves 121 may be formed in three or more places. Similarly, in the fourth embodiment, the holding pawls 125 are formed in two places of the fitting projection 111. However, the holding pawls 125 may be formed in three or more places.

In the fourth embodiment, the plurality of membrane modules 34 are coupled via the coupling portions 110. However, besides the membrane modules 34, the structure of the coupling portion 110 may be applied to, for example, the structure of a joint for connecting pipes.

When the membrane modules 34 are stacked and coupled by using a crane or the like, it is necessary to align the positions of the fitting projections 111 of the lower membrane module 34 and the positions of the fitting holes 112 of the upper membrane module 34. In this case, since the fitting projections 111 are displaceable in the front-back and left-right directions B and C and the projection inclined surfaces 133 are guided in contact with the hole inclined surfaces 134, if the positions of the fitting projections 111 and the positions of the fitting holes 112 are aligned to some degree, it is possible to couple the membrane modules 34 and adjust the positions later.

Figure 26:
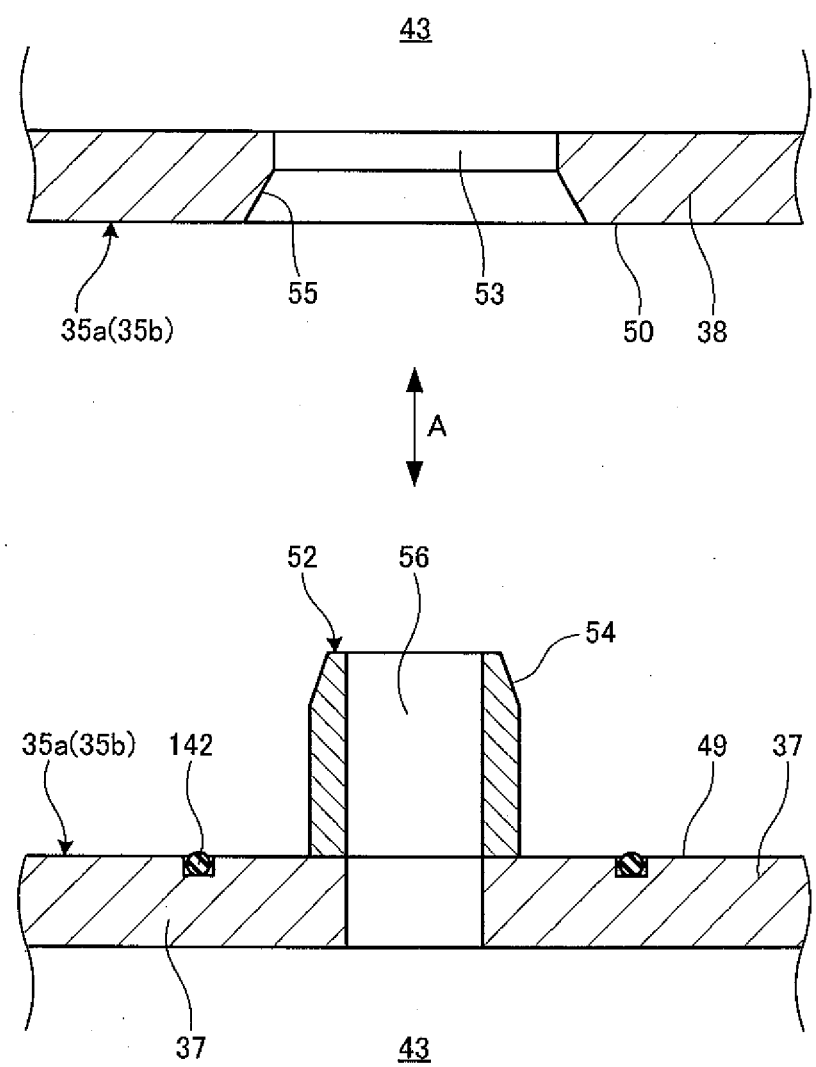
FIG. 26 is a longitudinal sectional view of a coupling portion of a membrane module according to a fifth embodiment of the present invention and shows a state in which a fitting projection is pulled out from a fitting hole.
Figure 27:
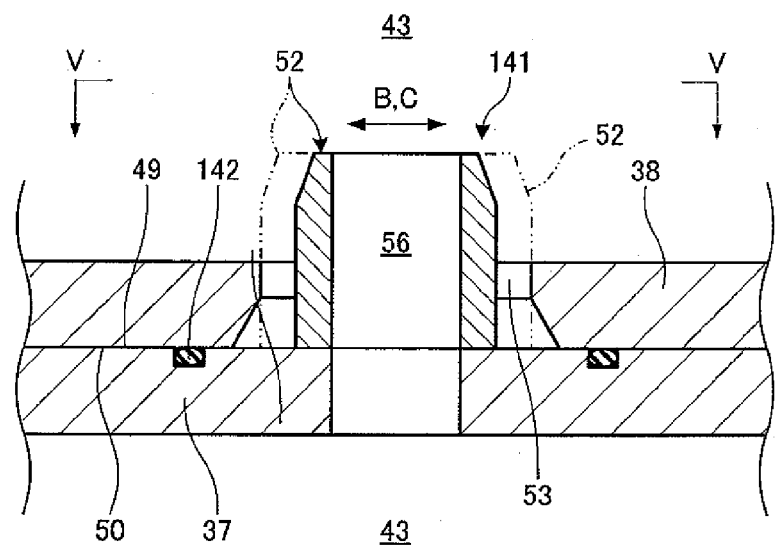
FIG. 27 is a longitudinal sectional view of the coupling portion of the membrane module according to the fifth embodiment and shows a state in which the fitting projection is fit into the fitting hole.
Figure 28:
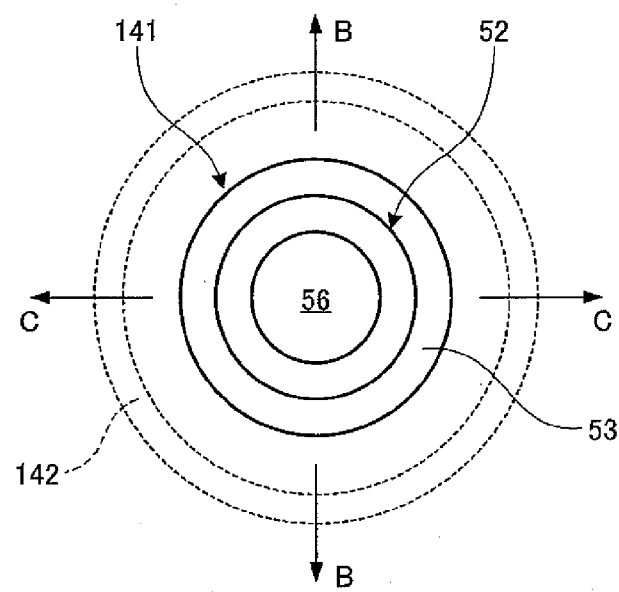
FIG. 28 is a view taken along arrows V-V of FIG. 27.

A fifth embodiment of the present invention is explained below on the basis of FIGS. 26 to 28.

The fifth embodiment has substantially the same configuration as the first embodiment. Therefore, the same members as those in the first embodiment are denoted by the same reference numerals and signs and a detailed explanation thereof is omitted.

A coupling portion 141 includes a cylindrical fitting projection 52 which is provided on an upper plate 37 of each of water collecting cases 35a and 35b and projects upward from an upper coupling surface 49 and a fitting hole 53 formed in a lower plate 38. The fitting hole 53 is opened to a lower coupling surface 50 and a water collecting space 43.

The fitting projection 52 can be detachably fit into the fitting hole 53 in an up-down direction A. A flow hole 56 opened to the upper end of the fitting projection 52 and the water collecting space 43 is formed in the fitting projection 52 and the upper plate 37. A seal member 142 (e.g., an O ring) for sealing between the upper coupling surface 49 of a lower membrane module 34 and the lower coupling surface 50 of an upper membrane module 34 is provided on the upper coupling surface 49 of each of the water collecting cases 35a and 35b.

The diameter of the fitting hole 53 is set larger than the outer diameter of the fitting projection 52. Consequently, the fitting projection 52 is displaceable within a predetermined range F in a front-back direction B and a left-right direction C with respect to the fitting hole 53 in a state in which the fitting projection 52 is fit into the fitting hole 53. The predetermined range F is equivalent to a difference obtained by subtracting the outer diameter of the fitting projection 52 from the diameter of the fitting hole 53.

With the configuration, the same operations and advantages as those in the first embodiment are obtained. As in the third embodiment, an error may occur between a space D1 between the fitting projection 52 of the one water collecting case 35a and the fitting projection 52 of the other water collecting case 35b and a space D2 between the fitting hole 53 of the one water collecting case 35a and the fitting hole 53 of the other water collecting case 35b.

In such a case, when the plurality of membrane modules 34 are vertically stacked and coupled via the coupling portions 141, if the positions of the fitting projections 52 are deviated with respect to the positions of the fitting holes 53 within the predetermined range F, the fitting projections 52 of the lower membrane module 34 can be fit into the fitting holes 53 of the upper membrane module 34. Consequently, the error between the space D1 between the left and right fitting projections 52 and the space D2 between the left and right fitting holes 53 is absorbed. It is possible to surely insert the fitting projections 52 of the lower membrane module 34 into the fitting holes 53 of the upper membrane module 34.

Water tightness is kept by the seal member 142 between the upper coupling surface 49 of the lower membrane module 34 and the lower coupling surface 50 of the upper membrane module 34.

Figure 29:
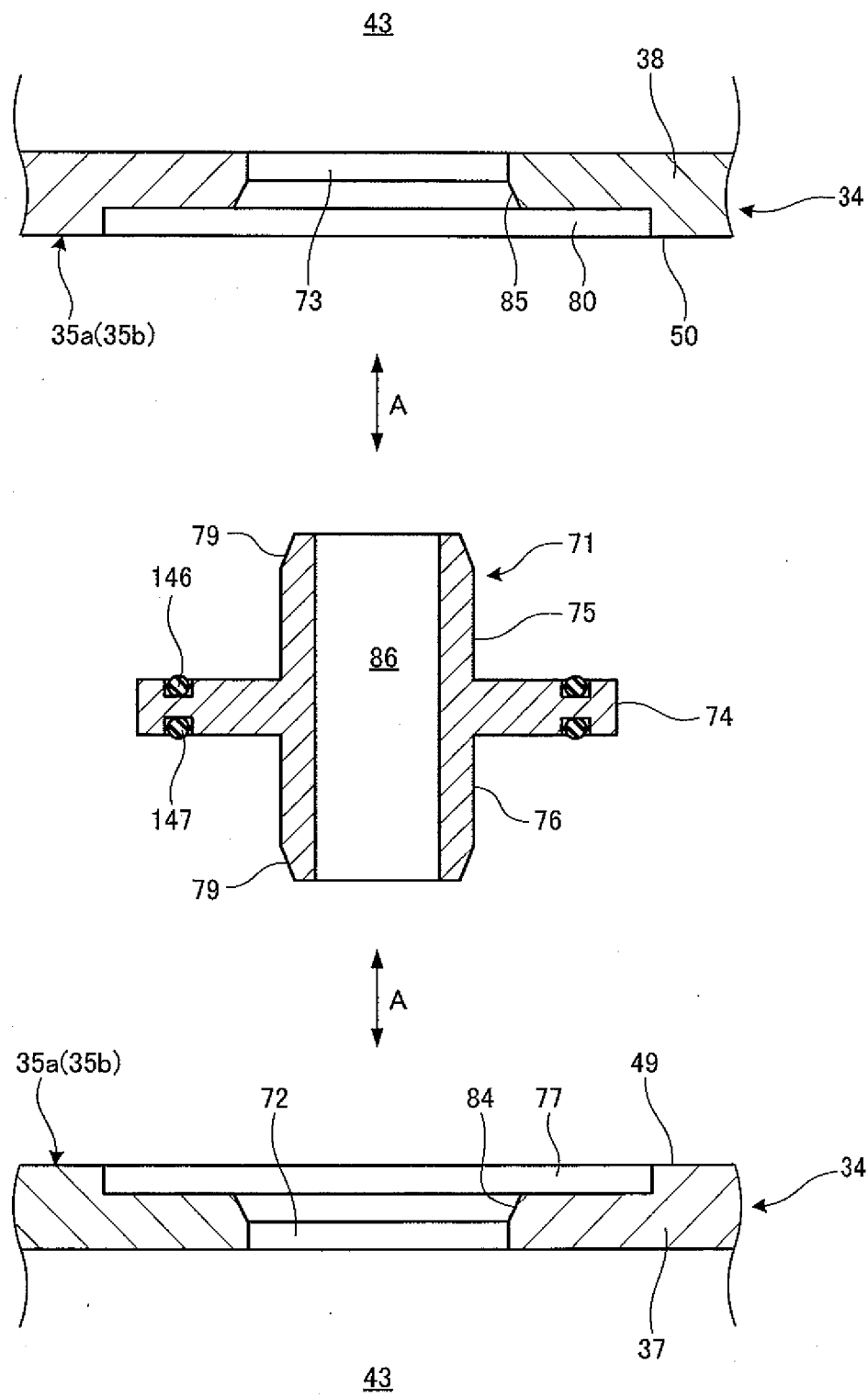
FIG. 29 is a longitudinal sectional view of a coupling portion of a membrane module according to a sixth embodiment of the present invention and shows a state in which a fit-in member is disengaged from a fitting hole.
Figure 30:
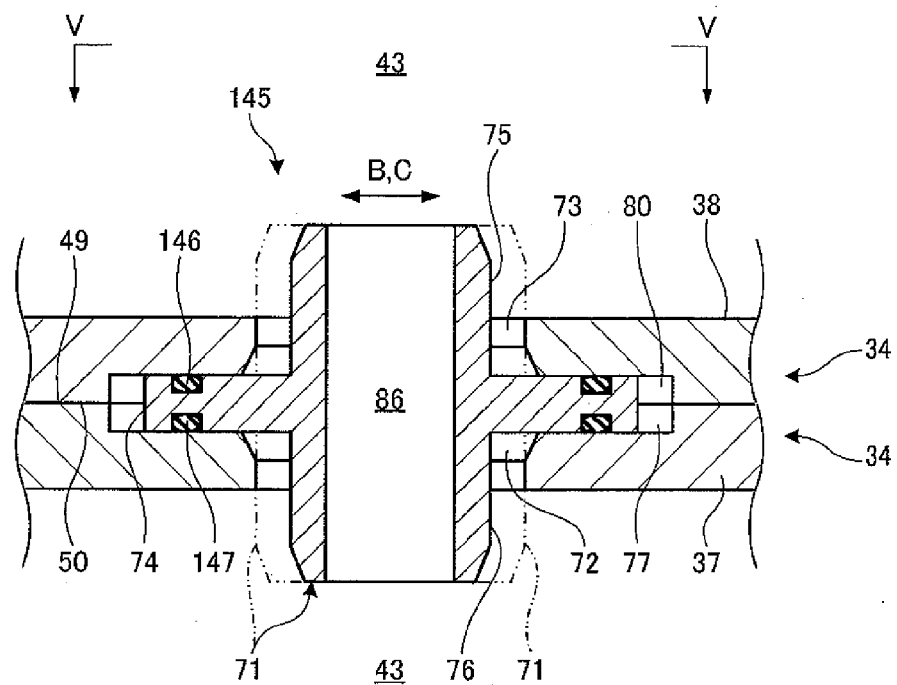
FIG. 30 is a longitudinal sectional view of the coupling portion of the membrane module according to the sixth embodiment and shows a state in which the fit-in member is fit into the fitting hole.
Figure 31:
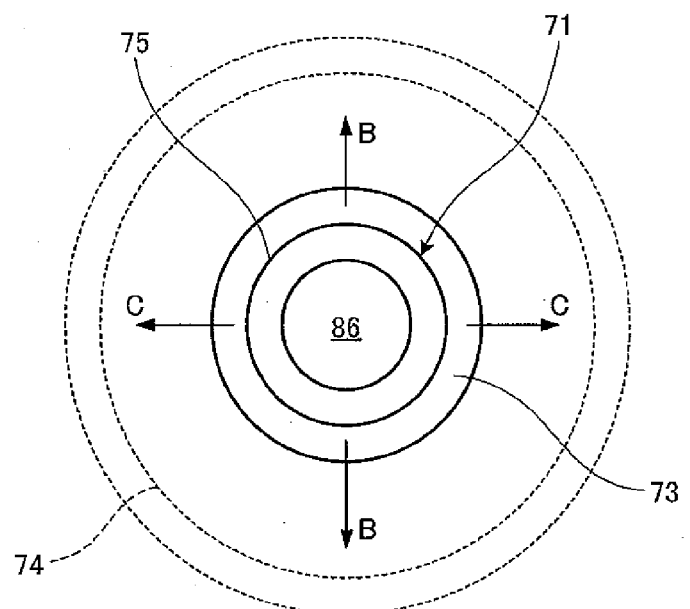
FIG. 31 is a view taken along arrows V-V of FIG. 30.

A sixth embodiment of the present invention is explained below on the basis of FIGS. 29 to 31.

The sixth embodiment has substantially the same configuration as the second embodiment. Therefore, the same members as those in the second embodiment are denoted by the same reference numerals and signs and a detailed explanation thereof is omitted.

A coupling portion 145 includes a fit-in member 71, an upper fitting hole 72, and a lower fitting hole 73. The upper fitting hole 72 is opened to an upper recess 77 and a water collecting space 43. The lower fitting hole 73 is opened to a lower recess 80 and the water collecting space 43.

On one side (upper surface) of a plate portion 74 of the fit-in member 71, a seal member 146 (e.g., an O ring) is provided for sealing between the upper end face (inner end face) of the lower recess 80 of an upper membrane module 34 and the one side (upper surface) of the plate portion 74. On the other side (lower surface) of the plate portion 74 of the fit-in member 71, a seal member 147 (e.g., an O ring) is provided for sealing between the lower end face (inner end face) of the upper recess 77 of a lower membrane module 34 and the other side (lower surface) of the plate portion 74.

The diameter of the fitting holes 72 and 73 is set larger than the outer diameter of fitting projections 75 and 76 of the fit-in member 71. The diameter of the recesses 77 and 80 is set larger than the outer diameter of the plate portion 74 of the fit-in member 71. Consequently, the fit-in member 71 is displaceable within a predetermined range F in a front-back direction B and a left-right direction C with respect to the fitting holes 72 and 73 in a state in which the fit-in member 71 is fit into the fitting holes 72 and 73. The predetermined range F is equivalent to smaller one of a difference obtained by subtracting the outer diameter of the fitting projections 75 and 76 from the diameter of the fitting holes 72 and 73 and a difference obtained by subtracting the outer diameter of the plate portion 74 from the diameter of the recesses 77 and 80.

With the configuration, the same operations and advantages as those in the second embodiment are obtained. An error may occur between a space D1 between the upper fitting hole 72 of one water collecting case 35a and the upper fitting hole 72 of the other water collecting case 35b and a space D2 between the lower fitting hole 73 of the one water collecting case 35a and the lower fitting hole 73 of the other water collecting case 35b.

In such a case, when the plurality of membrane modules 34 are vertically stacked and coupled via the coupling portions 145, if the positions of the upper fitting holes 72 are deviated with respect to the positions of the lower fitting holes 73 within the predetermined range F, the one fitting projection 75 of the fit-in member 71 can be fit into the lower fitting hole 73 and the other fitting projection 76 of the fit-in member 71 can be fit into the upper fitting hole 7.

Consequently, the error between the space D1 between the upper left and right fitting holes 72 and the space D2 between the lower left and right fitting holes 73 is absorbed. It is possible to surely insert the other fitting projection 76 of the fit-in member 71 into the upper fitting hole 72 of the lower membrane module 34. It is possible to surely insert the one fitting projection 75 of the fit-in member 71 into the lower fitting hole 73 of the upper membrane module 34.

Water tightness is kept by the seal member 146 between the upper end face of the lower recess 80 of the upper membrane module 34 and the one side of the plate portion 74 of the fit-in member 71. Water tightness is kept by the seal member 147 between the lower end face of the upper recess 77 of the lower membrane module 34 and the other side of the plate portion 74 of the fit-in member 71.

Figure 33:
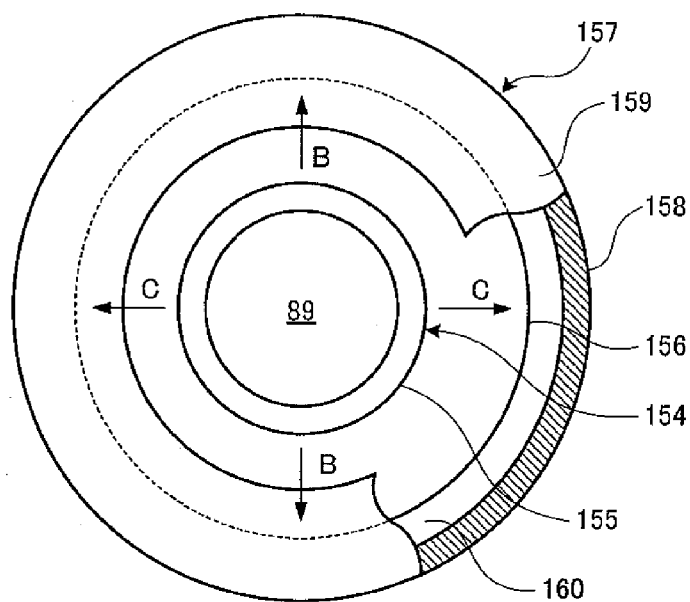
FIG. 33 is a view taken along arrows V-V of FIG. 32.
Figure 34:
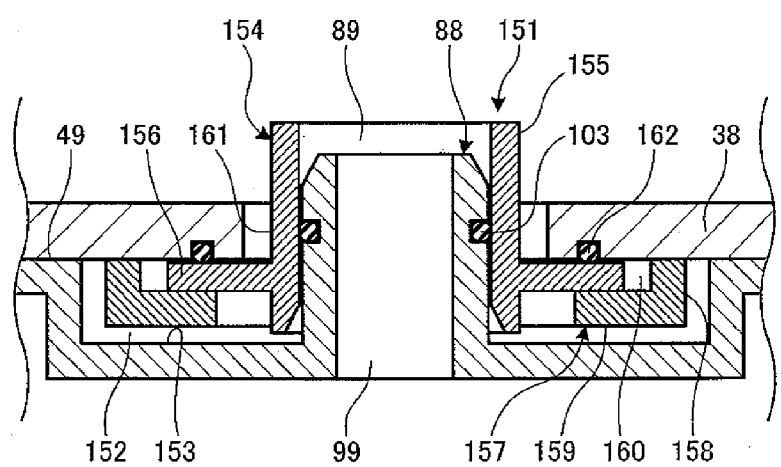
FIG. 34 is a longitudinal sectional view of the coupling portion of the membrane module according to the seventh embodiment and shows a state in which the fitting projection is fit into the fitting hole.

A seventh embodiment of the present invention is explained below on the basis of FIGS. 32 to 34.

In the third embodiment, the fitting projection 88 is displaceable and the fitting hole 89 is fixed. However, in a coupling portion 151 in the seventh embodiment, a fitting projection 88 is fixed and a fitting hole 89 is displaceable. The same members as those in the third embodiment are denoted by the same reference numerals and signs and a detailed explanation thereof is omitted.

A recess 152 is formed on an upper coupling surface 49 of each of water collecting cases 35a and 35b. The cylindrical fitting projection 88 is fixed to a lower bottom surface 153 (inner bottom surface) of the recess portion 152.

The fitting hole 89 is formed in a tubular member 154 displaceable in a front-back direction B and a left-right direction C (an example of a direction orthogonal to a predetermined arrangement direction (up-down direction A)) with respect to a lower coupling surface 50. The tubular member 154 includes a cylinder portion 155 and an outer brim portion 156 formed on the outer circumferential surface of the cylinder portion 155. The cylinder portion 155 is inserted into a through hole 161 formed in a lower plate 38 of each of the water collecting cases 35a and 35b. The lower end of the fitting hole 89 is opened to the lower end of the cylinder portion 155. The upper end of the fitting hole 89 is opened to a water collecting space 43.

The tubular member 154 is held on the lower plate 38 of each of the water collecting cases 35a and 35b by a holding member 157. Like the holding member 92 of the third embodiment, the holding member 157 includes a circumferential wall portion 158 and an inner brim portion 159. The outer brim portion 156 is inserted into a holding space 160 formed between the lower plate 38 of each of the water collecting cases 35a and 35b and the inner brim portion 159 of the holding member 157.

A range obtained by subtracting the outer diameter of the outer brim portion 156 of the tubular member 154 from the inner diameter of the circumferential wall portion 158 of the holding member 157 is represented as E1 and a range obtained by subtracting the outer diameter of the cylinder portion 155 from the diameter of the through hole 161 is represented as E2. Displacement amounts in the front-back and left-right directions B and C of the fitting hole 89 (i.e., the tubular member 154) are regulated to smaller one (an example of a predetermined range) of the range E1 and the range E2. A seal member 162 (e.g., an O ring) for sealing between the lower coupling surface 50 and the outer brim portion 156 of the tubular member 154 is provided on the lower plate 38 of each of the water collecting cases 35a and 35b. The outer brim portion 156 is supported by the holding member 157 in a state in which the outer brim portion 156 is separated slightly downward from the lower coupling surface 50.

With the configuration, the same operations and advantages as those in the third embodiment are obtained. Specifically, when a plurality of membrane modules 34 are vertically stacked, the fitting projection 88 of the coupling portion 151 of the lower membrane module 34 is fit into the fitting hole 89 of the upper membrane module 34 from below and the upper coupling surface 49 of the lower membrane module 34 and the lower coupling surface 50 of the upper membrane module 34 are set in contact with each other. Consequently, as shown in FIG. 34, the lower membrane module 34 and the upper membrane module 34 adjacent to each other are coupled via the coupling portions 151. It is possible to prevent the upper membrane module 34 from disengaging from the lower membrane module 34 in the front-back direction B and the left-right direction C (an example of the direction orthogonal to the predetermined arrangement direction (the up-down direction A)).

In this way, it is possible to easily couple the plurality of upper and lower membrane modules 34 to form a membrane cassette 31. The water collecting spaces 43 of the plurality of upper and lower membrane modules 34 coupled to each other communicate with each other via flow holes 99 of the coupling portions 151.

In some cases, the dimensions of the membrane module 34 are different between during manufacture and after use, because of contained water, a temperature change and the like due to the use in a liquid to be treated 33. An error may occur between a space D1 between the fitting projection 88 of the one water collecting case 35a and the fitting projection 88 of the other water collecting case 35b and a space D2 between the fitting hole 89 of the one water collecting case 35a and the fitting hole 89 of the other water collecting case 35b.

Figure 32:
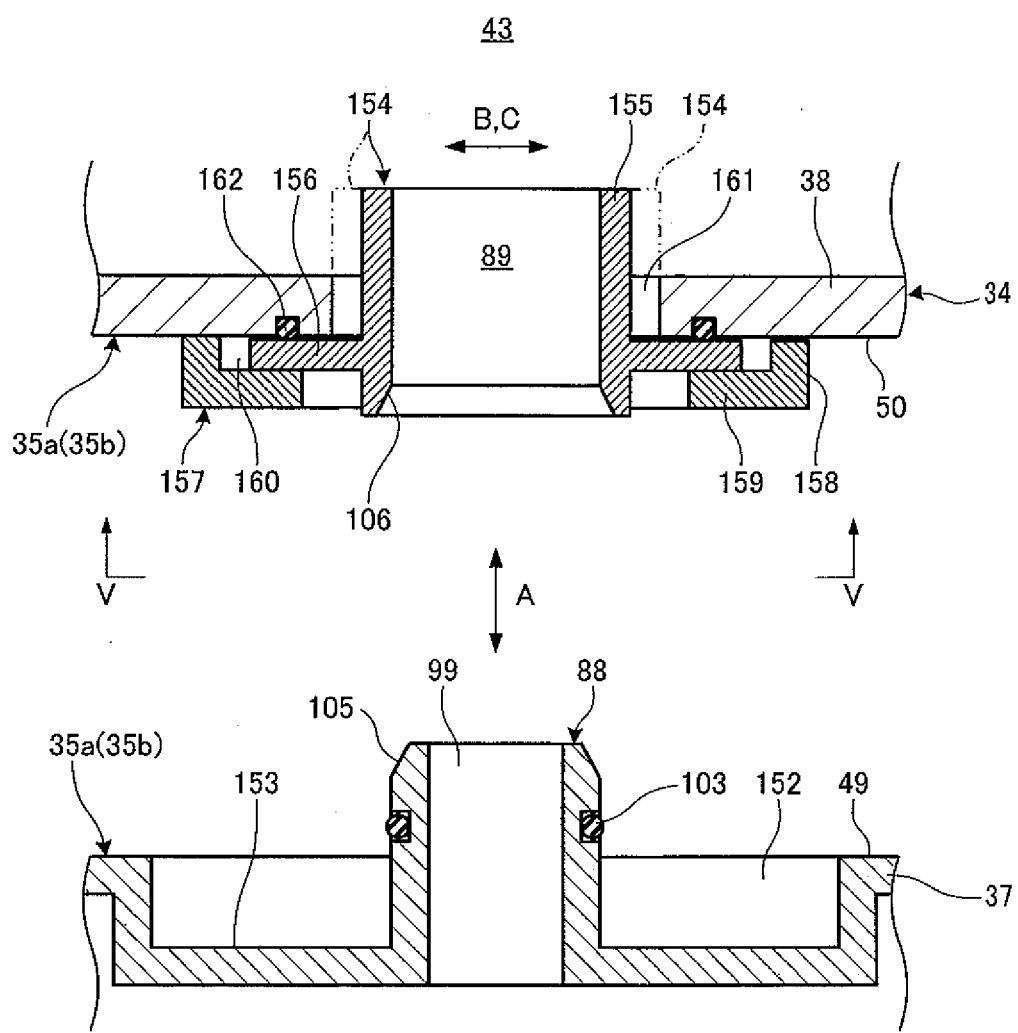
FIG. 32 is a longitudinal sectional view of a coupling portion of a membrane module according to a seventh embodiment of the present invention and shows a state in which a fitting projection is pulled out from a fitting hole.

In such a case, when the membrane module 34 already used and the membrane module 34 not used are vertically stacked and coupled via the coupling portions 151, as indicated by an imaginary line of FIG. 32, the tubular member 154 of the upper membrane module 34 slides in the front-back direction B or the left-right direction C to be displaced while keeping water tightness with a lower coupling surface 150. Consequently, the error between the space D1 between the left and right fitting projections 88 and the space D2 between the left and right fitting holes 89 is absorbed. It is possible to surely insert the fitting projections 88 of the lower membrane module 34 into the fitting holes 89 of the upper membrane module 34.

Figure 35:
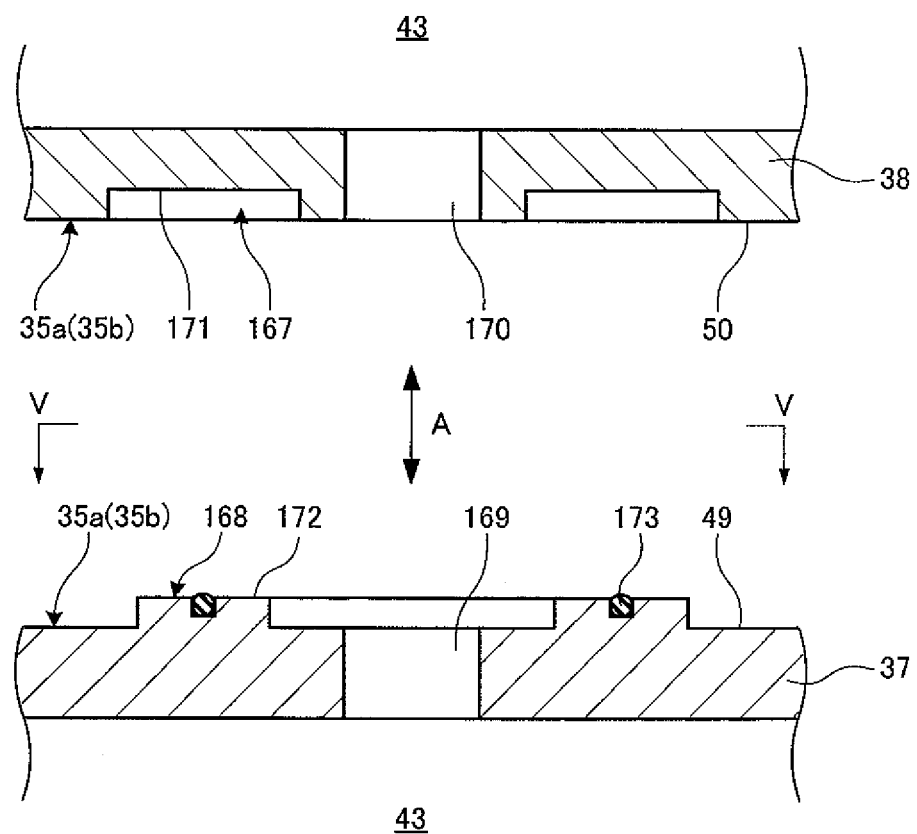
FIG. 35 is a longitudinal sectional view of a coupling portion of a membrane module according to an eighth embodiment of the present invention and shows a state in which a fitting projection is pulled out from a fitting recess.
Figure 36:
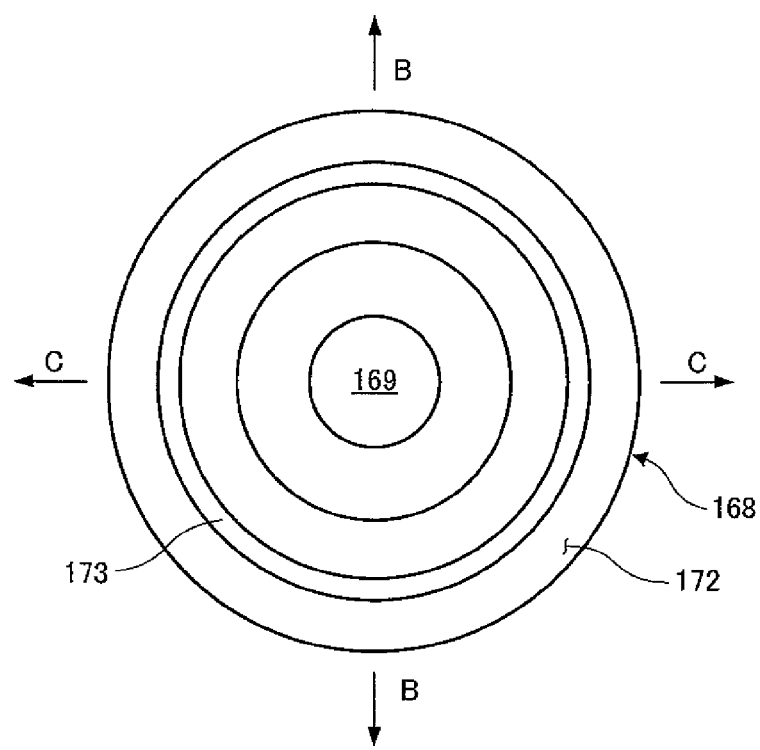
FIG. 36 is a view taken along arrows V-V of FIG. 35.
Figure 37:
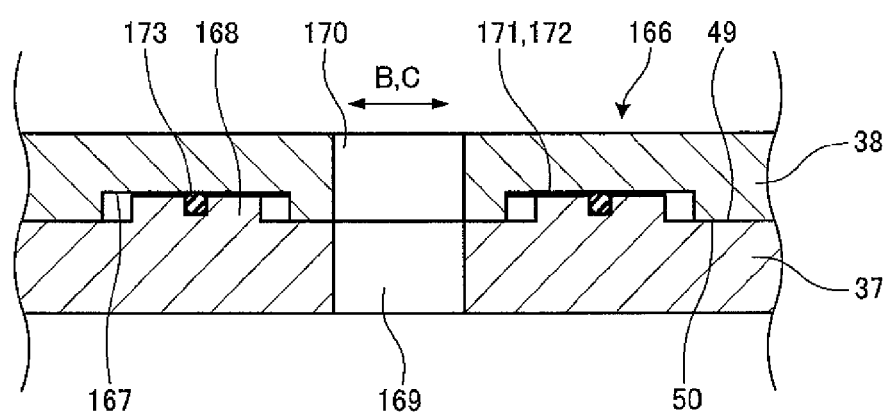
FIG. 37 is a longitudinal sectional view of the coupling portion of the membrane module according to the eighth embodiment and shows a state in which the fitting projection is fit in the fitting recess.

An eighth embodiment of the present invention is explained below on the basis of FIGS. 35 to 37.

A coupling portion 166 includes a fitting recess 167, a fitting projection 168 that can be detachably fit into the fitting recess 167, and upper and lower flow holes 169 and 170. The fitting recess 167 is formed in a lower coupling surface 50 of each of water collecting cases 35a and 35b. The fitting projection 168 is formed on an upper coupling surface 49 of each of the water collecting cases 35a and 35b.

The upper flow hole 169 is formed in an upper plate 37 of each of the water collecting cases 35a and 35b and opened to the upper coupling surface 49 and a water collecting space 43. The fitting projection 168 is formed in an annular shape to surround the outer circumference of the upper flow hole 169.

The lower flow hole 170 is formed in a lower plate 38 of each of the water collecting cases 35a and 35b and opened to the lower coupling surface 50 and the water collecting space 43. The fitting recess 167 is formed in an annular shape to surround the outer circumference of the lower flow hole 170.

The fitting projection 168 can be detachably fit into the fitting recess 167 in an up-down direction A. A seal member 173 (e.g., an O ring) for sealing between an upper inner surface 171 (inner bottom surface) of the fitting recess 167 and an upper end face 172 (distal end surface) of the fitting projection 168 is provided on the fitting projection 168.

The outer diameter of the fitting recess 167 is set larger than the outer diameter of the fitting projection 168. The inner diameter of the fitting projection 168 is set larger than the inner diameter of the fitting recess 167. Consequently, the fitting projection 168 can be displaced within a predetermined range F in a front-back direction B and a left-right direction C with respect to the fitting recess 167 in a state in which the fitting projection 168 is fit into the fitting recess 167. The predetermined range F is equivalent to smaller one of a difference obtained by subtracting the outer diameter of the fitting projection 168 from the outer diameter of the fitting recess 167 and a difference obtained by subtracting the inner diameter of the fitting recess 167 from the inner diameter of the fitting projection 168.

Operations in the configuration are explained below.

When a plurality of membrane modules 34 are vertically stacked, the fitting projection 168 of the lower membrane module 34 is fit into the fitting recess 167 from below to join the upper coupling surface 49 of the lower membrane module 34 and the lower coupling surface 50 of the upper membrane module 34. Consequently, as shown in FIG. 37, the lower membrane module 34 and the upper membrane module 34 adjacent to each other are coupled via the coupling portions 166. It is possible to prevent the upper membrane module 34 from disengaging from the lower membrane module 34 in the front-back direction B and the left-right direction C (an example of the direction orthogonal to the predetermined arrangement direction (the up-down direction A)).

In this way, it is possible to easily couple the plurality of upper and lower membrane modules 34 to form a membrane cassette 31. The water collecting spaces 43 of the plurality of upper and lower membrane modules 34 coupled to each other communicate with each other via the upper and lower flow holes 169 and 170.

An error may occur between a space D1 between the fitting projection 168 of the one water collecting case 35a and the fitting projection 168 of the other water collecting case 35b and a space D2 between the fitting recess 167 of the one water collecting case 35a and the fitting recess 167 of the other water collecting case 35b.

In such a case, when the plurality of membrane modules 34 are vertically stacked and coupled via the coupling portions 166, if the positions of the fitting projections 168 are deviated with respect to the positions of the fitting recesses 167 within the predetermined range F, the fitting projection 168 of the lower membrane module 34 can be fit into the fitting recess 167 of the upper membrane module 34. Consequently, the error between the space D1 between the left and right fitting projections 168 and the space D2 between the left and right fitting holes 53 is absorbed. It is possible to surely insert the fitting projection 168 of the lower membrane module 34 into the fitting recess 167 of the upper membrane module 34. Water tightness is kept by the seal member 173 between the upper coupling surface 49 of the lower membrane module 34 and the lower coupling surface 50 of the upper membrane module 34.

In the first embodiment, as shown in FIG. 3, a fitting projection 52 is provided on the upper plate 37 of each of the water collecting cases 35a and 35b, a fitting hole 53 is provided on the lower plate 38 of each of the water collecting cases 35a and 35b, and the plurality of membrane modules 34 are stacked and coupled in the up-down direction A. However, the position where the fitting projection 52 is attached is not limited to the upper plate 37. The position where the fitting hole 53 is formed is not limited to the lower plate 38. For example, the fitting projection 52 may be provided on the lower plate 38 and the fitting hole 53 may be provided on the upper plate 37.

Figure 38:
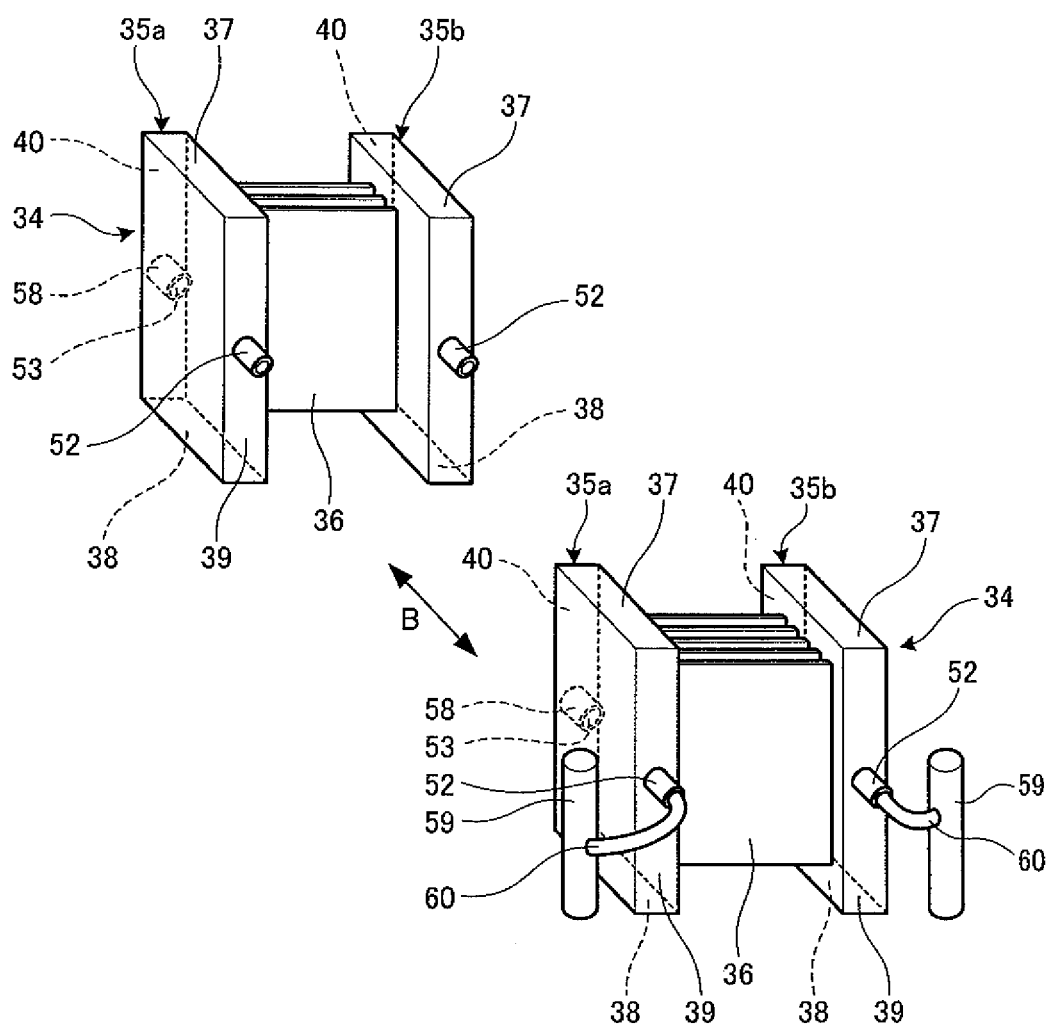
FIG. 38 is a perspective view of a membrane module according to a ninth embodiment of the present invention.

In a ninth embodiment, as shown in FIG. 38, a fitting projection 52 may be provided on a front plate 39 of each of water collecting cases 35a and 35b and a fitting hole 53 may be provided in a rear plate 40 of each of the water collecting cases 35a and 35b. In this case, a plurality of membrane modules 34 are arranged and coupled in a front-back direction B (predetermined arrangement direction). The fitting projection 52 of the one water collecting case 35a on the left or right of the membrane module 34 located at the forefront end and one water collecting pipe 59 on the left or right are connected via a connection pipe 60. Similarly, the fitting projection 52 of the other water collecting case 35b on the left or right thereof and the other water collecting pipe 59 on the left or right thereof are connected via the connection pipe 60. In the second to eighth embodiments, as in the ninth embodiment, the plurality of membrane modules 34 may be arranged and coupled in the front-back direction B.

Figure 39:
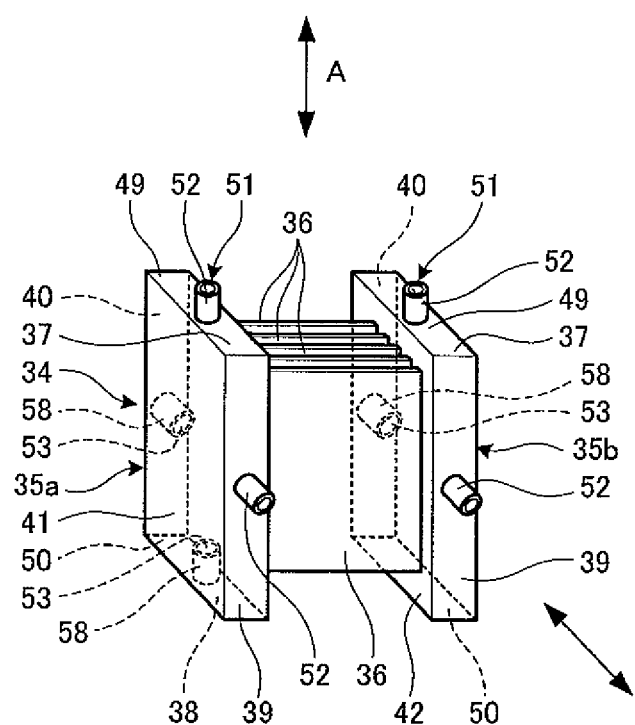
FIG. 39 is a perspective view of a membrane module according to a tenth embodiment of the present invention.
Figure 40:
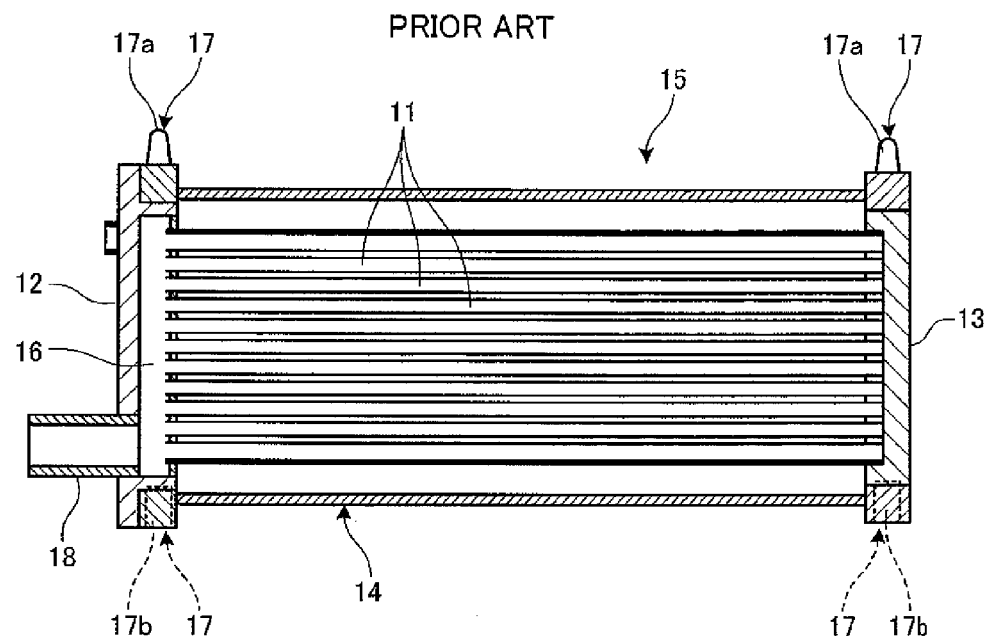
FIG. 40 is a longitudinal sectional view of a conventional membrane module.
Figure 41:
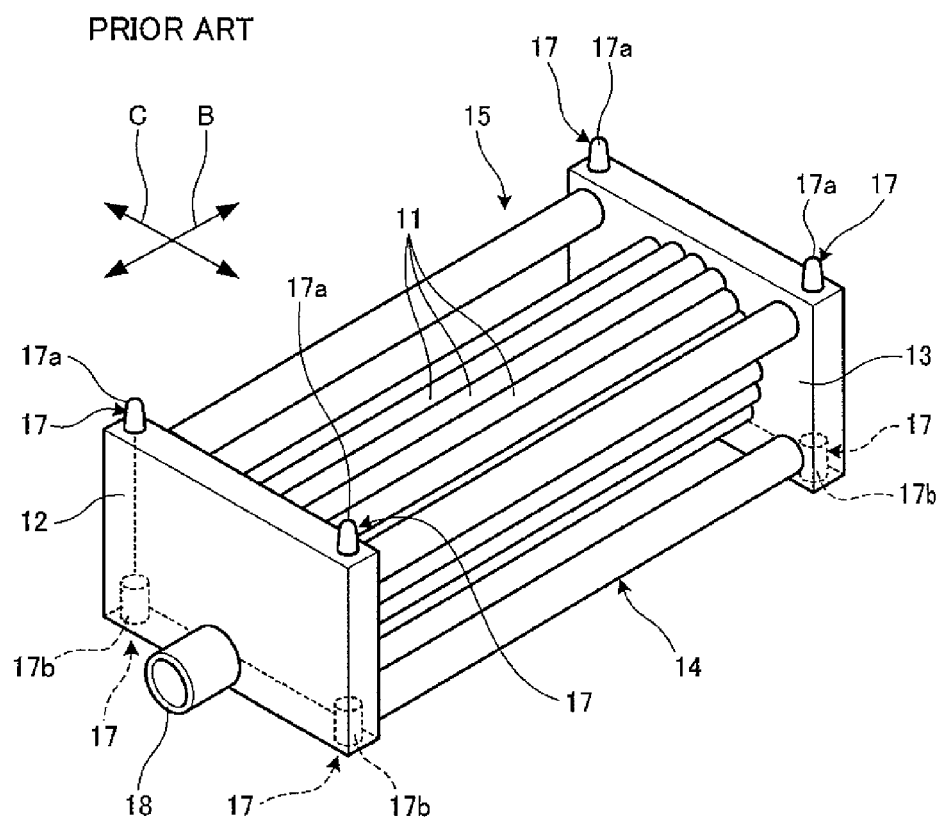
FIG. 41 is a perspective view of the conventional membrane module.
Figure 42:
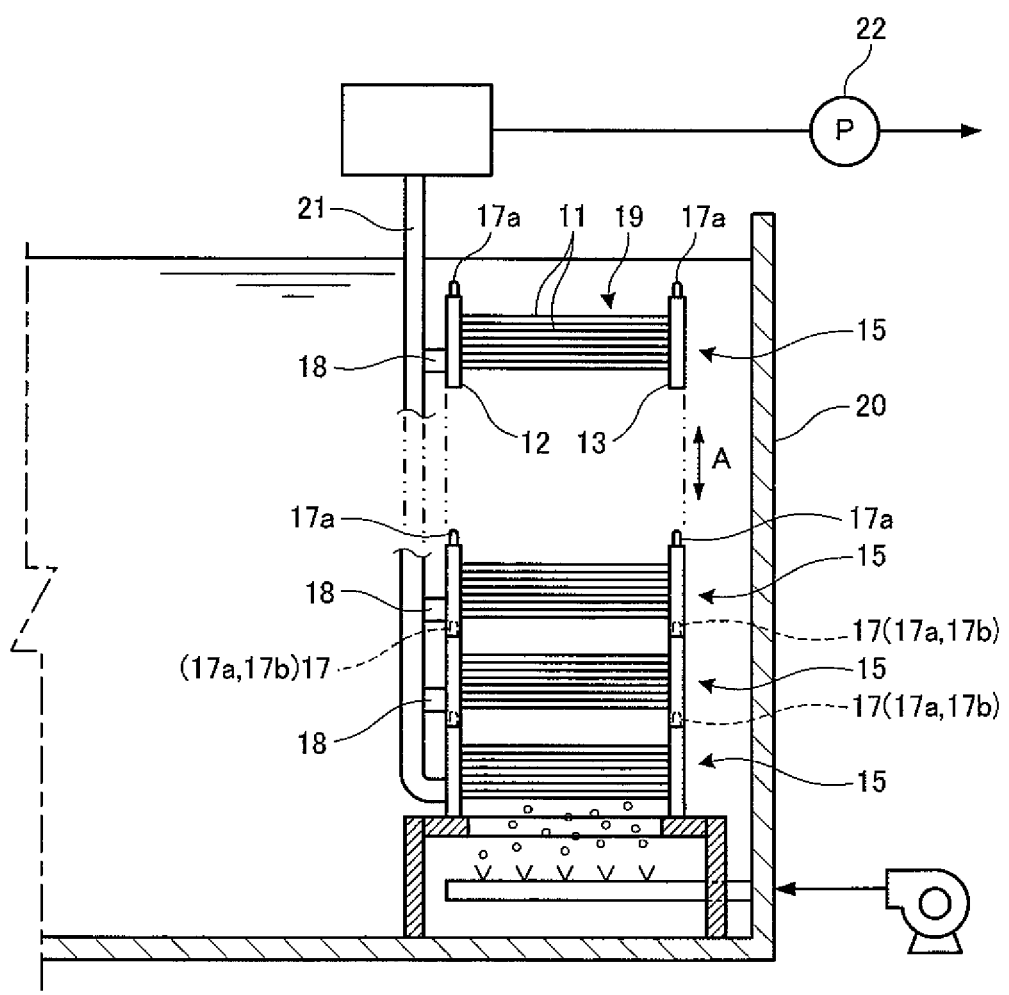
FIG. 42 is a diagram of a membrane cassette formed by stacking a plurality of conventional membrane modules.

In a tenth embodiment, as shown in FIG. 39, fitting projections 52 may be provided on an upper plate 37 and a front plate 39 of each of water collecting cases 35a and 35b and fitting holes 53 may be provided on a lower plate 38 and a rear plate 40 of each of the water collecting cases 35a and 35b. In this case, a plurality of membrane modules 34 can be arranged and coupled in two directions of an up-down direction A and a front-rear direction B. In the second to eighth embodiments, as in the tenth embodiment, the plurality of membrane modules 34 may be arranged and coupled in the two directions of the up-down direction A and the front-rear direction B.

In the foregoing embodiments, the water collecting cases 35a and 35b of the top membrane module 34 are connected to the water collecting pipes 59 via the connection pipes 60. However, the water collecting pipes 59 may be provided in the lower part of the treatment tank 32 and the water collecting cases 35a and 35b of the bottom membrane module 34 may be connected to the water collecting pipes 59 via the connection pipes 60. At least one point of the water collecting cases 35a and 35b only has to be connected to the water collecting pipes 59. The connection pipes 60 do not have to be used.

In the foregoing embodiments, the projection inclined surfaces 54, 79, 105, and 133 are provided in the fitting projections 52, 75, 76, 88, and 111 and the hole inclined surfaces 55, 84, 85, 106, and 134 are provided in the fitting holes 53, 72, 73, 89, and 112. However, the advantages can be obtained even when the projection inclined surfaces 54, 79, 105, and 133 or the hole inclined surfaces 55, 84, 85, 106, and 134 are provided.

In the foregoing embodiments, the coupling portions 51, 70, 87, 110, 141, 145, 151, and 166 are formed in a cylindrical shape. However, the shape of the coupling potions 51, 70, 87, 110, 141, 145, 151, and 166 is not limited to the cylindrical shape. For example, the shape may be a square cylinder shape, a triangle cylinder shape, or other shapes.

In the third and fourth embodiments, only the fitting projections 88 and 111 are displaceably held by the holding mechanisms 92 and 116. However, both of the fitting projections 88 and 111 and the tubular members 101 and 128 may be displaceably held respectively by holding mechanisms.

In the seventh embodiment, only the tubular member 154 is displaceably held by the holding mechanism 157. However, both of the fitting projection 88 and the tubular member 154 may be displaceably held respectively by holding mechanisms.

The invention claimed is:

1. A membrane module that is immersed in a liquid to be treated and performs filtration, comprising:
    a pair of water collecting cases; and at least one membrane element provided between the pair of water collecting cases, wherein
    water collecting spaces in which permeate having permeated through the membrane element is collected are formed in the water collecting cases,
    the water collecting cases can be coupled via coupling portions to water collecting cases of another membrane module adjacent to the membrane module in a predetermined arrangement direction,
    the coupling portions including tubular members having fitting holes, fitting projections that can be detachably fit into fitting holes in the predetermined arrangement direction, flow holes formed on the fitting projections, and holding mechanisms for holding the fitting projections to be displaceable within a predetermined range in a direction orthogonal to the predetermined arrangement direction are provided on end surfaces in the predetermined arrangement direction of the water collecting cases,
    the water collecting spaces communicate with water collecting spaces of the water collecting cases of the other membrane module via the flow holes of the coupling portions,
    the holding mechanisms include tubular circumferential wall portions provided in the water collecting cases, holding grooves and inserting grooves formed in the circumferential wall portions, annular brim portions provided in the fitting projections and projected to an outer side in the radial direction, and holding pawls provided in outer circumferential portions of the annular brim portions,
    the inserting grooves are formed in the predetermined arrangement direction,
    the holding grooves are formed in a circumferential direction and communicate with lower end portions of the inserting grooves,
    the fitting projections are inserted into inner sides of the circumferential wall portions,
    by insertion of the holding pawls from the inserting grooves to the holding grooves, the fitting projections are restrained in the predetermined arrangement direction,
    a seal members directly contact the annular brim portions of the fitting projections and the water collecting cases while being provided between the water collecting cases and the annular brim portions of the fitting projections in the predetermined arrangement direction and thereby water tightness is maintained,
    the outer diameters of the annular brim portion are set smaller than the inner diameters of the circumferential wall portions,
    the fitting projections are displaceable to the direction orthogonal to the predetermined arrangement direction to the circumferential wall portions by means of the annular brim portions sliding in a plane orthogonal to the predetermined arrangement direction via the seal members, and
    displacement amounts of the fitting projections are regulated to a range obtained by subtracting the outer diameter of the annular brim portions from the inner diameter of the circumferential wall portions.

2. The membrane module according claim 1, comprising at least one of a projection inclined surface formed in a distal end portion of the fitting projection and narrowed in the radial direction toward a distal end and a hole inclined surface formed in an outer end portion of the fitting hole and expanded in the radial direction toward an outer end.

3. A membrane cassette in which the plurality of membrane modules according to claim 1 are arrayed in the predetermined arrangement direction, wherein
    the water collecting cases of the membrane modules adjacent to each other are detachably coupled via the coupling portions, and
    the water collecting spaces of the membrane modules adjacent to each other communicate with each other via the flow holes.

* * * * *